United States Patent
Ukon et al.

(10) Patent No.: US 8,653,386 B2
(45) Date of Patent: Feb. 18, 2014

(54) CUTTING APPARATUS, BREAKER, CONTACTOR, AND ELECTRICAL CIRCUIT BREAKER

(75) Inventors: Tetsuya Ukon, Osaka (JP); Teruaki Tsuchiya, Osaka (JP); Futoshi Okugawa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 999 days.

(21) Appl. No.: 12/680,467

(22) PCT Filed: Sep. 3, 2008

(86) PCT No.: PCT/JP2008/002411
§ 371 (c)(1),
(2), (4) Date: Mar. 26, 2010

(87) PCT Pub. No.: WO2009/040992
PCT Pub. Date: Apr. 2, 2009

(65) Prior Publication Data
US 2010/0218659 A1 Sep. 2, 2010

(30) Foreign Application Priority Data

Sep. 27, 2007 (JP) ................................. 2007-251202
Sep. 2, 2008 (JP) ................................. 2008-225138

(51) Int. Cl.
*H01H 85/00* (2006.01)
(52) U.S. Cl.
USPC ....................................................... 200/61.08

(58) Field of Classification Search
USPC .............. 200/238, 61.08, 509, 254; 83/639.1, 83/697
See application file for complete search history.

(56) References Cited

U.S. PATENT DOCUMENTS

| 2,419,828 A * | 4/1947 | Ferris .......................... 200/61.53 |
| 3,003,045 A * | 10/1961 | Tichenor .................... 200/61.08 |
| 3,915,236 A | 10/1975 | Stichling |
| 4,224,487 A * | 9/1980 | Simonsen .................. 200/61.08 |
| 5,877,563 A * | 3/1999 | Krappel et al. .............. 307/10.1 |
| 5,990,572 A | 11/1999 | Yasukuni et al. |
| 2005/0073387 A1 | 4/2005 | Kordel et al. |

FOREIGN PATENT DOCUMENTS

| EP | 1 492 139 A1 | 12/2004 |
| JP | 63-216616 A | 9/1988 |
| JP | 10-241524 A | 9/1998 |
| JP | 2000-123695 A | 4/2000 |

* cited by examiner

*Primary Examiner* — Edwin A. Leon
(74) *Attorney, Agent, or Firm* — Birch, Stewart, Kolasch & Birch, LLP.

(57) ABSTRACT

A blade (11), which includes a cutting portion (21) and an insulating portion (22), is used as a blade (11) of a cutting apparatus (10). The cutting portion (21) is made of a metal, and has a blade portion. The insulating portion (22) is formed by an insulating member, and forms a part that adjoins the blade portion in a direction opposite to an advance direction of the blade (11). The cutting apparatus (10) is configured so that, when cutting a current-carrying member (15), the blade (11) advances until the insulating portion (22) contacts cut faces of the current-carrying member (15) after the cutting portion (21) cuts the current-carrying member (15).

20 Claims, 20 Drawing Sheets

CUTTING APPARATUS, BREAKER, CONTACTOR, AND ELECTRICAL CIRCUIT BREAKER

TECHNICAL FIELD

The present invention relates to cutting apparatuses that are configured to cut a current-carrying member configured to conduct electricity, breakers using the cutting apparatus, contactors using the cutting apparatus, and electrical circuit breakers using the cutting apparatus.

BACKGROUND ART

Cutting apparatuses, which are configured to cut a current-carrying member configured to conduct electricity, are conventionally known in the art. This type of cutting apparatus is used to cut off electrical power from a power source in case of, e.g., disasters.

As this type of cutting apparatus, Patent Document 1, for example, discloses an electrical-wire cutting apparatus having a ceramic blade. If a metal part contacts a cutting location of an electrical wire as a current-carrying member, electricity flows between the cut pieces of the electrical wire. Thus, this electrical-wire cutting apparatus uses insulating ceramic for the blade. However, one problem is that this cutting apparatus cannot be used to cut relatively rigid electrical wires due to the strength of the ceramic.

As a solution to this problem, Patent Document 2 discloses a cutting apparatus having a metal blade coated with an insulating material. In this cutting apparatus, a hitting stand, which is configured to place thereon an electrical wire to be cut, is also coated with an insulating material, in addition to the blade.

CITATION LIST

Patent Document

PATENT DOCUMENT 1: Japanese Published Patent Application No. S63-216616
PATENT DOCUMENT 2: Japanese Published Patent Application No. 2000-123695

SUMMARY OF THE INVENTION

Technical Problem

Incidentally, in such a conventional cutting apparatus, a blade portion of the blade is subjected to a large force when cutting a current-carrying member, whereby an insulating coating film can delaminate from the blade portion, exposing the metal. Thus, the exposed metal of the blade can contact the current-carrying member, and electricity may not be prevented from flowing between the cut pieces of the current-carrying member.

The present invention was developed in view of the above problem, and it is an object of the present invention to reliably prevent electricity from flowing between cut pieces of a current-carrying member, in a cutting apparatus that includes a blade having a cutting portion made of a metal.

Solution to the Problem

A first invention is intended for a cutting apparatus (10) including a blade (11), and configured to advance the blade (11) in a predetermined advance direction to cut a current-carrying member (15) configured to conduct electricity. The blade (11) includes a cutting portion (21), which is made of a metal and has a blade portion configured to cut the current-carrying member (15), and an insulating portion (22), which is formed by an insulating member and forms a part that adjoins the blade portion in a direction opposite to the advance direction. The cutting apparatus (10) is configured so that, when cutting the current-carrying member (15), the blade (11) advances until the insulating portion (22) contacts cut faces of the current-carrying member (15) after the cutting portion (21) cuts the current-carrying member (15).

According to a second invention, in the first invention, the insulating portion (22) of the blade (11) is provided so as to adjoin the cutting portion (21) in a direction opposite to the advance direction.

According to a third invention, in the first invention, the cutting apparatus further includes a cylindrical case (16) configured to accommodate the blade (11), wherein the cylindrical case (16) has a placing hole (26) configured to insert therethrough the current-carrying member (15) to be cut, and the placing hole (26) is formed so as to be located on an advance side of the blade portion of the blade (11) before the blade (11) advances.

According to a fourth invention, in the third invention, the cylindrical case (16) includes a cylindrical case main body (41), which is made of a metal and has the placing hole (26) formed therein, and an insulating case insulating portion (42), which covers a region surrounding the placing hole (26) in an inner surface of the case main body (41).

According to a fifth invention, in the fourth invention, the case insulating portion (42) is formed by a pair of fixing members (42a, 42b), which are provided along the inner surface of the case main body (41), and are configured to hold the current-carrying member (15) therebetween.

According to a sixth invention, in the fifth invention, the cutting portion (21) has a columnar shape, the pair of fixing members (42a, 42b) have a cylindrical shape so that the blade (11) can be inserted therethrough, the cutting portion (21) has an insertion portion (36) configured to insert the current-carrying member (15) therethrough, the insertion portion (36) being formed by a through hole or a cut-out, which extends between side surfaces of the cutting portion (21), a part of the cutting portion (21), which adjoins the insertion portion (36) on a side opposite to a side to which the blade (11) advances, serves as the blade portion, and the blade (11) is provided so that an outer peripheral surface of the cutting portion (21) faces respective inner peripheral surfaces of both fixing members (42a, 42b) before the blade (11) advances.

According to a seventh invention, in the third invention, the cutting apparatus (10) further includes an insulating member (46) provided between a peripheral side surface of the placing hole (26) and the current-carrying member (15).

According to an eighth invention, in the third invention, a region surrounding the placing hole (26) in an inner surface of the case main body (41), or a peripheral side surface of the placing hole (26) is coated with an insulating material.

According to a ninth invention, in any one of the third to eighth inventions, the cutting apparatus (10) is configured so as to advance the blade (11) by increasing a pressure in a gas generating chamber (24) by a high pressure gas generated by a reaction of a gas generating agent, the gas generating chamber (24) being formed on a side opposite to a side to which the blade (11) advances in the cylindrical case (16), the insulating portion (22) has a columnar shape, and after the blade (11) advances, an entire periphery of the insulating portion (22)

contacts a region located on a gas generating chamber (24) side of the current-carrying member (15) in the inner surface of the cylindrical case (16).

According to a tenth invention, in the ninth invention, the insulating portion (22) includes a columnar insulating portion main body (43), and a sealing protruding portion (44) provided along an entire circumference of the insulating portion main body (43) so as to protrude outward beyond an outer peripheral surface of the insulating portion main body (43), and after the blade (11) advances, the sealing protruding portion (44) of the insulating portion (22) contacts the region located on the gas generating chamber (24) side of the current-carrying member (15) in the inner surface of the cylindrical case (16).

According to an eleventh invention, in any one of the third to ninth inventions, the insulating portion (22) includes a columnar insulating portion main body (43), and a latching protruding portion (45) protruding outward beyond an outer peripheral surface of the insulating portion main body (43), and the latching protruding portion (45) fits in the placing hole (26) after the blade (11) advances.

According to a twelfth invention, in any one of the third to ninth inventions, the insulating portion (22) includes a columnar insulating portion main body (43), and a protruding portion (44, 45) protruding outward beyond an outer peripheral surface of the insulating portion main body (43), and the cylindrical case (16) has a blade holding portion (27) formed so that the protruding portion (44, 45) of the insulating portion (22) fits in the blade holding portion (27) before the blade (11) advances.

According to a thirteenth invention, in any one of the first to twelfth inventions, the cutting apparatus (10) further includes a blade stop portion (32) positioned on a side to which the blade (11) advances, so that the cutting portion (21) fits in the blade stop portion (32) after cutting the current-carrying member (15).

According to a fourteenth invention, in the thirteenth invention, the blade stop portion (32) has a fitting groove (33) formed so that a cutting edge of the blade portion of the cutting portion (21) fits in the fitting groove (33) after cutting the current-carrying member (15).

According to a fifteenth invention, in the fourteenth invention, the blade stop portion (32) is made of a material that is softer than the cutting portion (21), and the fitting groove (33) has a V-shaped cross section, and an angle between wall surfaces of the fitting groove (33) is narrower than an angle of the cutting edge of the cutting portion (21).

According to a sixteenth invention, in the fourteenth or fifteenth invention, the cutting portion (21) has a columnar shape, the cutting edge of the blade portion of the cutting portion (21) is formed along an outer circumference of a top end of the cutting portion (21), and in the blade stop portion (32), the fitting groove (33) extends in a circular shape corresponding to a shape of the cutting edge of the blade portion of the cutting portion (21).

According to a seventeenth invention, in the first invention, the insulating portion (22) forms at least one of both side portions of the blade (11), which extend continuously with a base end of a cutting edge portion of the blade (11).

An eighteenth invention is intended for a breaker (50) including: an inter-terminal member (51) having a movable contact (53) and a fixed contact (52), formed by a current-carrying member (15), and configured to connect a power supply terminal (54) and a load terminal (55), the breaker (50) being configured so that, in case of an abnormal current, the movable contact (53) automatically separates from the fixed contact (52) to interrupt a current flow between the power supply terminal (54) and the load terminal (55). The breaker (50) further includes the cutting apparatus (10) of any one of the first to seventeenth inventions, which is positioned so as to be able to cut the inter-terminal member (51).

A nineteenth invention is intended for a contactor (70) including: an inter-terminal member (71) having a movable contact (73) and a fixed contact (68, 69), formed by a current-carrying member (15), and configured to connect a power supply terminal (74) and a load terminal (75), the contactor (70) being configured to control a current flow between the power supply terminal (74) and the load terminal (75) by moving the movable contact (73). The contactor (70) further includes the cutting apparatus (10) of any one of the first to seventeenth inventions, which is positioned so as to be able to cut the inter-terminal member (71).

A twentieth invention is intended for an electrical circuit breaker (90) including: a breaker (50) connected to a power supply terminal (94); a contactor (70) connected to a load terminal (95); a connecting member (92) formed by a current-carrying member (15), and configured to connect the breaker (50) and the contactor (70); and the cutting apparatus (10) of any one of the first to seventeenth inventions, which is positioned so as to be able to cut the connecting member (92).

[Functions]

In the first invention, the insulating portion (22) forms a part of the blade (11), which adjoins the blade portion in a direction opposite to the advance direction. When cutting the current-carrying member (15), the cutting portion (21) cuts the current-carrying member (15). The blade (11) continues to move even after the cutting portion (21) cuts the current-carrying member (15). Eventually, the blade (11) stops with the insulating portion (22) being in contact with the cut faces of the current-carrying member (15). The cut pieces of the current-carrying member (15) are insulated from each other by the insulation portion (22), which is subjected to a smaller force than the cutting portion (21). The insulating portion (22) is made of an insulating member, and does not delaminate like a coating film.

In the second invention, the insulating portion (22) of the blade (11) is positioned so as to adjoin the cutting portion (21) in the direction opposite to the advance direction. When cutting the current-carrying member (15), the cutting portion (21) passes between the cut pieces of the current-carrying member (15). The blade (11) stops with the insulating portion (22) being interposed between the cut pieces of the current-carrying member (15).

In the third invention, the blade (11) is accommodated in the cylindrical case (16). In the cylindrical case (16), the placing hole (26) is formed so as to be located on the advance side of the blade portion of the blade (11) before the blade (11) advances. The current-carrying member (15) to be cut is placed in the placing hole (26).

In the fourth invention, the case main body (41) is made of a metal, and the region surrounding the placing hole (26) in the inner surface of the case main body (41) is covered by the insulating case-insulating portion (42). Thus, the case-insulating portion (42) prevents the cut pieces of the current-carrying member (15) from contacting the case main body (41).

In the fifth embodiment, the case insulating portion (42) is formed by the pair of fixing members (42a, 42b), which are configured to hold the current-carrying member (15) therebetween. That is, the case insulating portion (42) serves not only to prevent the cut pieces of the current-carrying member (15) from contacting a region surrounding the placing hole (26), but also to fix the current-carrying member (15).

In the sixth invention, the insertion portion (36), which is formed by a through hole or a cut-out, is formed in the columnar cutting portion (21). Before the blade (11) advances, the current-carrying member (15) is inserted through the insertion portion (36), and the outer peripheral surface of the cutting portion (21) faces the respective inner peripheral surfaces of both fixing members (42a, 42b). When the blade (11) is advanced in this state, the current-carrying member (15) inserted through the insertion portion (36) is cut by the blade portion that adjoins the insertion portion (36) on a side opposite to a side to which the blade (11) advances. If the outer peripheral surface of the cutting portion (21) faces only the inner peripheral surface of one (42a) of the pair of fixing members (42a, 42b), which is located on the side opposite to the side to which the blade (11) advances, the cutting portion (21) can hit the end face of the other fixing member (42b) located on the side to which the blade (11) advances, in the event that there is a placement error of the pair of fixing members (42a, 42b). On the other hand, in the sixth invention, the outer peripheral surface of the cutting portion (21) faces also the inner peripheral surface of the fixing member (42b) before the blade (11) advances. Thus, the cutting portion (21) does not hit the end face of the fixing member (42b) during advancing movement.

In the seventh invention, the insulating member (46) is provided between the peripheral side surface of the placing hole (26) and the current-carrying member (15). Thus, the insulating member (46) prevents the cut pieces of the current-carrying member (15) from contacting the case main body (41).

In the eighth invention, the region surrounding the placing hole (26) in the inner surface of the case main body (41), or the peripheral side surface of the placing hole (26) is coated with an insulating material. Thus, the insulating coating prevents the cut pieces of the current-carrying member (15) from contacting the case main body (41).

In the ninth invention, after the blade (11) advances, the entire periphery of the insulating portion (22) contacts a region located on the gas generating chamber (24) side of the current-carrying member (15) in the inner surface of the cylindrical case (16). This prevents a gas generated in the gas generating chamber (24) from reaching the vicinity of the cut faces of the current-carrying member (15) through the gap between the inner surface of the cylindrical case (16) and the outer surface of the insulating portion (22).

In the tenth invention, the insulating portion (22) includes the sealing protruding portion (44), which is provided along the entire circumference of the columnar insulating portion main body (43) so as to protrude outward beyond the outer peripheral surface of the insulating portion main body (43). After the blade (11) advances, the sealing protruding portion (44) contacts the region located on the gas generating chamber (24) side of the current-carrying member (15) in the inner surface of the cylindrical case (16). This prevents a gas generated in the gas generating chamber (24) from flowing between the inner surface of the cylindrical case (16) and the outer surface of the insulating portion (22).

In the eleventh invention, the insulating portion (22) includes the latching protruding portion (45) that protrudes outward beyond the outer peripheral surface of the insulating portion main body (43). The latching protruding portion (45) fits in the placing hole (26) after the blade (11) advances. Thus, even if the blade (11) rebounds after advancing, the latching protruding portion (45) is caught by the peripheral side surface of the placing hole (26).

In the twelfth invention, the protruding portion (44, 45) of the insulating portion (22), which protrudes outward beyond the outer peripheral surface of the insulating portion main body (43), fits in the blade holding portion (27) of the cylindrical case (16) before the blade (11) advances. Thus, even if the cutting apparatus (10) is excited, the blade (11) is prevented from advancing because the protruding portion (44, 45) is held by the blade holding portion (27).

In the thirteenth invention, the blade stop portion (32) is positioned on the side to which the blade (11) advances. The cutting portion (21) fits in the blade stop portion (32) after cutting the current-carrying member (15). Thus, the blade (11) hardly rebounds after hitting the blade stop portion (32).

In the fourteenth invention, the fitting groove (33) is formed in the blade stop portion (32). A cutting edge of the blade portion of the cutting portion (21) fits in the fitting groove (33) after cutting the current-carrying member (15). Thus, the blade (11) hardly rebounds after hitting the blade stop portion (32).

In the fifteenth invention, the angle between the wall surfaces of the V-shaped fitting groove (33) is narrower than the angle of the cutting edge of the cutting portion (21). The blade stop portion (32) is made of a material that is softer than the cutting portion (21). Thus, when hitting the fitting groove (33), the cutting portion (21) increases the angle between the wall surfaces of the fitting groove (33), whereby the cutting edge of the blade portion of the cutting portion (21) is held in the fitting groove (33).

In the sixteenth invention, the cutting edge of the blade portion extends in a circular shape along the outer circumference of the top end of the columnar cutting portion (21). The fitting groove (33) extends in a circular shape corresponding to the shape of the cutting edge of the blade portion of the cutting portion (21). Thus, the cutting edge of the blade portion of the cutting portion (21) fits in the cutting groove (33) even if the cutting portion (21) rotates.

In the seventeenth invention, at least one of both side portions of the blade (11), which extend continuously with the base end of the cutting edge portion of the blade (11), is formed by the insulating portion (22) made of an insulating material. When cutting the current-carrying member (15), the cutting portion (21) cuts the current-carrying member (15). The blade (11) continues to move even after the cutting portion (21) cuts the current-carrying member (15). Eventually, the blade (11) stops with the insulating portion (22) being in contact with the cut faces of the current-carrying member (15).

In the eighteenth invention, the cutting apparatus (10) is positioned so as to be able to cut the inter-terminal member (51). This enables the cutting apparatus (10) to cut the inter-terminal member (51) to forcibly interrupt the current flow between the power supply terminal (54) and the load terminal (55). Note that means configured to operate the cutting apparatus (10) may be a part of the breaker (50), or may be provided outside the breaker (50).

In the nineteenth invention, the cutting apparatus (10) is positioned so as to be able to cut the inter-terminal member (71). This enables the cutting apparatus (10) to cut the inter-terminal member (71) to forcibly interrupt the current flow between the power supply terminal (74) and the load terminal (75). Note that means configured to operate the cutting apparatus (10) may be a part of the contactor (70), or may be provided outside the contactor (70).

In the twentieth invention, the cutting apparatus (10) is positioned so as to be able to cut the connecting member (92). This enables the cutting apparatus (10) to cut the inter-connecting member (92) to forcibly interrupt the current flow between the power supply terminal (94) and the load terminal (95). Note that means configured to operate the cutting apparatus (10) may be a part of the electrical circuit breaker (90), or may be provided outside the electrical circuit breaker (90).

Advantages of the Invention

In the present invention, the insulating portion (22), which is subjected to a smaller force than the cutting portion (21) and does not delaminate like a coating film, eventually contacts the cut faces of the current-carrying member (15). Thus, the cutting portion (21), which is made of a metal, does not contact the cut faces of the current-carrying member (15) after the blade (11) advances, whereby electricity can be reliably prevented from flowing between the cut pieces of the current-carrying member (15).

In the third invention, the placing hole (26), which is configured to place therein the current-carrying member (15) to be cut, is formed in the cylindrical case (16) configured to accommodate the blade (11). Thus, the current-carrying member (15) to be cut can be easily placed at a predetermined position by merely inserting the current-carrying member (15) through the placing hole (26).

In the fourth to eighth inventions, the cut pieces of the current-carrying member (15) are prevented from contacting the case main body (41) that is made of a metal. This can prevent electricity from flowing between the cut pieces of the current-carrying member (15) via the case main body (41).

In the fifth invention, the case insulating portion (42) serves not only to prevent the cut pieces of the current-carrying member (15) from contacting a region surrounding the placing hole (26), but also to fix the current-carrying member (15). This eliminates the need to separately provide a member configured to fix the current-carrying member (15), whereby the configuration of the cutting apparatus (10) can be simplified.

In the sixth invention, the outer peripheral surface of the cutting portion (21) faces also the inner peripheral surface of the fixing member (42b) located on the side to which the blade (11) advances, before the blade (11) advances. Thus, even if there is a placement error of the pair of fixing members (42a, 42b), the cutting portion (21) does not hit this fixing member (42b) during advancing movement. This enables the blade (11) to reliably advance to a predetermined advanced position where the insulating portion (22) insulates the cut pieces of the insulating member (15) from each other, regardless of the placement error of the pair of fixing members (42a, 42b).

In the ninth invention, the gas generated in the gas generating portion (24) is prevented from reaching the vicinity of the cut faces of the current-carrying member (15) through the gap between the inner surface of the cylindrical case (16) and the outer surface of the insulating portion (22). The gas generated in the gas generating chamber (24) may have been plasmatized. If such a gas reaches the vicinity of the cut faces of the current-carrying member (15), electricity can flow between the current-carrying member (15) and the cylindrical case (16) via the gas. Moreover, a conductive product may be produced in the gas generating chamber (24) by a reaction of the gas generating agent. If such a conductive product reaches the vicinity of the cut faces of the current-carrying member (15) together with the gas generated in the gas generating chamber (24), electricity can flow between the current-carrying member (15) and the cylindrical case (16) via the conductive product. On the other hand, in the ninth invention, the gas generated in the gas generating chamber (24) is prevented from reaching the vicinity of the cut faces of the current-carrying member (15). Thus, electricity can be prevented from flowing between the current-carrying member (15) and the cylindrical case (16) via the gas generated in the gas generating chamber (24) and/or the conductive product produced in the gas generating chamber (24).

In the eleventh invention, the latching protruding portion (45) fits in the placing hole (26) after the blade (11) advances. Thus, even if the blade (11) rebounds after advancing, the latching protruding portion (45) is caught by the peripheral side surface of the placing hole (26). This prevents the blade (11) from rebounding greatly. If the blade (11) rebounds greatly, the cutting portion (21) can return to the position between the cut pieces of the current-carrying member (15), causing electricity to flow between the cut pieces of the current-carrying member (15) via the cutting portion (21). In the eleventh invention, since the blade (11) does not rebound greatly, electricity can be prevented from flowing between the cut pieces of the current-carrying member (15) via the cutting portion (21).

In the twelfth invention, the blade holding portion (27) is formed so that the protruding portion (44, 45) of the insulating portion (22) of the blade (11) fits in the blade holding portion (27) before the blade (11) advances. Thus, the blade (11) is held by the blade holding portion (27) even if the cutting apparatus (10) is excited. This can prevent or reduce displacement of the blade (11) from a predetermined position, where the blade (11) should be located before advancing, before the cutting apparatus (10) operates.

In the thirteenth invention, the cutting portion (21) fits in the blade stop portion (32) after cutting the current-carrying member (15). Thus, the blade (11) hardly rebounds after hitting the blade stop portion (32). This can prevent electricity from flowing between the cut pieces of the current-carrying member (15) via the cutting portion (21).

In the sixteenth invention, the fitting groove (33) extends in a circular shape corresponding to the shape of the cutting edge of the blade portion of the cutting portion (21). Thus, the cutting edge of the blade portion of the cutting portion (21) fits in the fitting groove (33) even if the cutting portion (21) rotates. In the case where both the cutting edge of the cutting portion (21) and the fitting groove (33) extend linearly, the respective extending directions of the cutting edge of the cutting portion (21) and the fitting groove (33) need to be matched with each other. This requires adjustment in the rotation direction when attaching the cutting portion (21) and the blade stop portion (32), thereby complicating the attaching operation. On the other hand, in the sixteenth invention, the cutting edge of the blade portion of the cutting portion (21) fits in the cutting groove (33) even if the cutting portion (21) rotates. Thus, no such adjustment in the rotation direction is required when attaching the cutting portion (21) and the blade stop portion (32), thereby facilitating the operation of attaching the cutting portion (21) and the blade stop portion (32).

In the case where the cutting apparatus (10) can be excited, such as, e.g., the case where the cutting apparatus (10) is placed in an automobile, the cutting portion (21) can rotate due to vibration. According to the fifteenth invention, the cutting portion (21) fits in the fitting groove (33) even if the cutting portion (21) rotates. Thus, the blade (11) can be reliably advanced to a predetermined advanced position where the insulating portion (22) insulates the cut pieces of the current-carrying member (15) from each other.

In the eighteenth and nineteenth inventions, the cutting apparatus (10) is capable of forcibly interrupting the current flow between the power supply terminal (54, 74) and the load terminal (55, 75). Conventionally, if, e.g., the movable contact (53, 73) and the fixed contact (52, 68, 69) are welded together, the current flow between the power supply terminal (54, 74) and the load terminal (55, 75) may not be interrupted even in the event of an abnormal current. This can cause failures of load equipments. On the other hand, in the eighteenth and nineteenth inventions, the cutting apparatus (10) is capable of forcibly interrupting the current flow between the power supply terminal (54, 74) and the load terminal (55, 75) even if, e.g., the movable contact (53, 73) and the fixed contact (52, 68, 69) are welded together. This can reliably prevent failures of the load equipments in the event of an abnormal current.

In the twentieth invention, the cutting apparatus (10) is capable of forcibly interrupting the current flow between the power supply terminal (94) and the load terminal (95). Conventionally, if, e.g., the movable contact (53) and the fixed contact (52) are welded together in the breaker (50), or the movable contact (73) and the fixed contact (68, 69) are welded together in the contactor (70), the current flow between the power supply terminal (94) and the load terminal (95) may not be interrupted even in the event of an abnormal current. This can cause failures of load equipments. On the other hand, in the twentieth invention, the cutting apparatus (10) is capable of forcibly interrupting the current flow between the power supply terminal (94) and the load terminal (95) even if, e.g., the breaker (50) and the contactor (70) are welded together. This can reliably prevent failures of the load equipments in the event of an abnormal current.

DESCRIPTION OF REFERENCE CHARACTERS

10 Cutting Apparatus
11 Blade
12 Placing Portion
13 Fitting Groove
15 Current-Carrying Member
21 Cutting Portion
22 Insulating Portion

DESCRIPTION OF EMBODIMENTS

Embodiments of the present invention will be described in detail below with reference to the accompanying drawings.

First Embodiment

A first embodiment of the present invention will be described below.

The first embodiment is a cutting apparatus (10) according to the present invention. The cutting apparatus (10) is configured to advance a blade (11) by using a high pressure gas generated by a reaction of a gas generating agent. This cutting apparatus (10) is of a type that uses an explosive as the gas generating agent configured to generate a high pressure gas.

Figure 1:
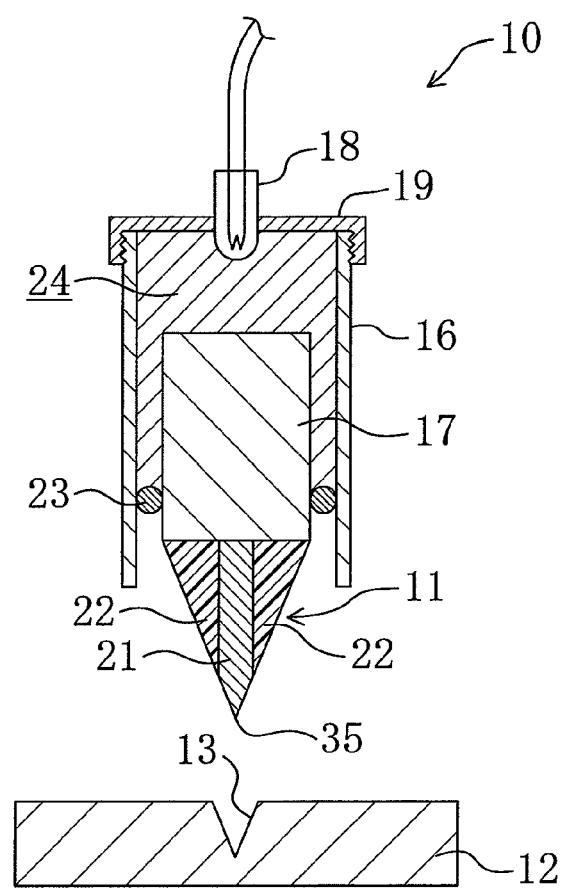
FIG. 1 is a longitudinal sectional view of a cutting apparatus according to a first embodiment.

Specifically, as shown in FIG. 1, the cutting apparatus (10) of the first embodiment includes the blade (11), a cylindrical member (16), a piston (17), and an ignition portion (18). The ignition portion (18) is formed by a blasting cap.

The cylindrical member (16) has a cylindrical shape. The upper part of the outer peripheral surface of the cylindrical member (16) is threaded. A lid member (19) having a threaded inner peripheral surface is screwed on the upper part of the cylindrical member (16). The lid member (19) closes the upper end of the cylindrical member (16). The ignition portion (18) is inserted through the center of the lid member (19). An O-ring shaped sealing member (23) is fixed to the inner peripheral surface of the cylindrical member (16).

The piston (17) has a columnar shape. The piston (17) is coupled to the base end of the blade (11). The piston (17) is inserted through the sealing member (23) with the outer peripheral surface of the piston (17) being in close contact with the sealing member (23). The space in the cylindrical member (16) is partitioned by the piston (17) to form an explosive chamber (24) that is filled with an explosive. The explosive chamber (24) forms a gas generating chamber (24).

The blade (11) is tapered from its base end toward its cutting edge as viewed in cross section. The blade (11) has a cutting portion (21) and insulating portions (22). The cutting portion (21) is a metal (e.g., steel) member. The cutting portion (21) forms a cutting edge portion, and a portion extending from the cutting edge portion to the base end of the blade (11). On the other hand, the insulating portions (22) are made of an insulating material (e.g., ceramic). The insulating portions (22) respectively form both side portions of the blade (11), which extend continuously with the base end of the cutting edge portion.

In the blade (11), the cutting portion (21) is interposed between the insulating portions (22). The insulating portions (22) are fixed to the cutting portion (21) by, e.g., bonding with an adhesive or the like. In the first embodiment, the insulating portions (22) form a part of the blade (11). Note that only one of the side portions may be formed by the insulating portion (22).

The cutting apparatus (10) of the first embodiment further includes a placing portion (12) configured to place a current-carrying member (15) thereon. The placing portion (12) is a so-called hitting stand. The placing portion (12) is made of, e.g., a steel material whose surface is coated with an insulating material. The placing portion (12) is coupled to the cylindrical member (16) by a coupling member, not shown, and is positioned so as to face the cutting edge of the blade (11).

Note that the current-carrying member (15) is a conductive member (e.g., an electrical wire) configured to conduct electricity between electrical equipments (e.g., a motor, a breaker, a contactor, and the like), or within an electrical equipment.

A fitting groove (13) is formed in the placing portion (12) at a position where the blade (11) comes in contact with the placing portion (12). The fitting groove (13) is a so-called V-groove. The fitting groove (13) is sized so that the entire cutting edge portion of the blade (11) fits therein. The fitting groove (13) is also formed so that the angle between the inclined surfaces of the fitting groove (13) is the same as that between the inclined surfaces of the cutting edge portion of the blade (11). The depth of the fitting groove (13) is slightly greater than the height of the cutting edge portion of the blade (11).

The cutting apparatus (10) is placed with a cable wire (15) of, e.g., a factory or the like being fixed to the placing portion (12). The cutting apparatus (10) is also placed with the ignition portion (18) being connected to a fire alarm, an earthquake alarm, or the like. The explosive chamber (24) is filled with an explosive. An alarm signal is sent to the ignition portion (18) upon detection of a fire by the fire alarm, or upon detection of an earthquake by the earthquake alarm. The ignition portion (18) detonates the explosive in response to the alarm signal.

Figure 2:
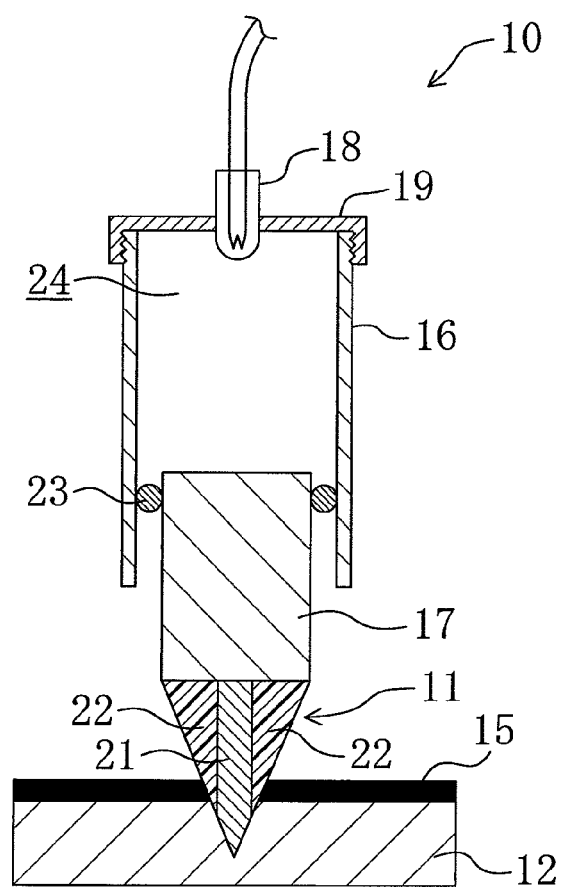
FIG. 2 is a longitudinal sectional view of the cutting apparatus of the first embodiment after a blade has advanced.

The detonation of the explosive generates a high pressure gas, whereby thrust is applied to the blade (11) in the direction toward the cutting edge. The blade (11) advances in the direction toward the cutting edge, and the cutting portion (21), which is made of a metal and forms the cutting edge portion of the blade (11), instantaneously cuts (breaks) the cable wire (15). The blade (11) further advances, and as shown in FIG. 2, stops with the entire cutting edge portion of the blade (11) fitting in the fitting groove (13) of the placing portion (12). In this state, the insulating portions (22), which respectively form the side portions, are exposed from the edge of the fitting groove (13), and the insulating portions (22) are in contact with the cut faces of the cable wire (15), respectively. When cutting the cable wire (15), the insulating portions (22) eventually contact the cut faces of the cable wire (15), respectively.

[Advantages of the First Embodiment]

According to the first embodiment, the cutting portion (21), which is made of a metal, cuts the current-carrying member (15). Thus, the cutting apparatus (10) is capable of cutting a highly rigid current-carrying member (15). In the first embodiment, the insulating portions (22), which are subjected to a smaller force than the cutting portion (21) and do not delaminate like a coating film, eventually contact the cut faces of the current-carrying member (15), respectively. Thus, the cutting portion (21), which is made of a metal, does not contact the cut faces of the current-carrying member (15) after the blade (11) advances, whereby electricity can be reliably prevented from flowing between the cut pieces of the current-carrying member (15).

In the first embodiment, the fitting groove (13), which fittingly receives the entire cutting edge portion, is provided in the placing portion (12), so that the insulating portions (22) eventually contact the current-carrying member (15) in the operation of cutting the current-carrying member (15). According to the first embodiment, the configuration in which the insulating portions (22) eventually contact the current-carrying member (15) is implemented by a relatively simple configuration by forming a groove in the placing portion (12).

(First Modification of the First Embodiment)

Figure 3:
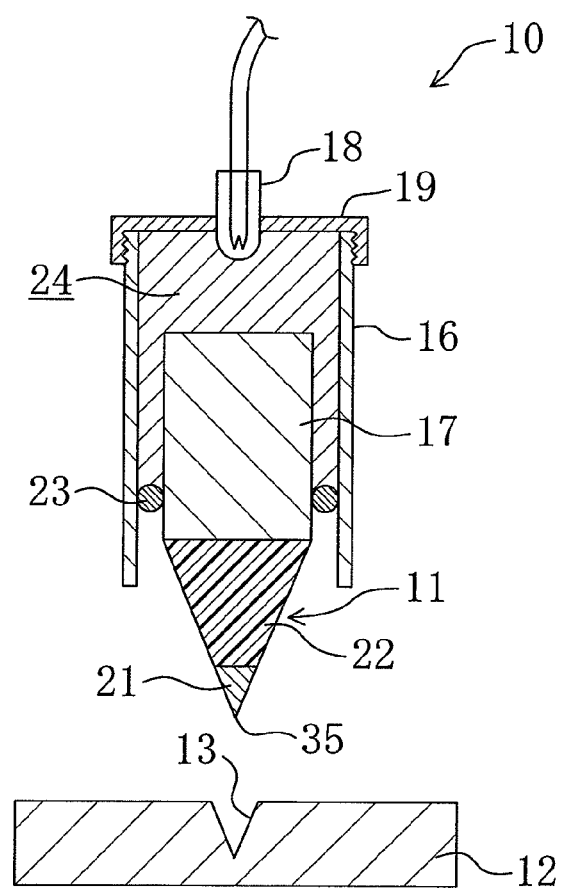
FIG. 3 is a longitudinal sectional view of a cutting apparatus according to a first modification of the first embodiment.

In the first embodiment, as shown in FIG. 3, only the cutting edge portion of the blade (11) may be formed as the cutting portion (21).

(Second Modification of the First Embodiment)

In the first embodiment, the placing portion (12) may be made of an insulating material.

Second Embodiment

A second embodiment of the present invention will be described below.

Figure 4:
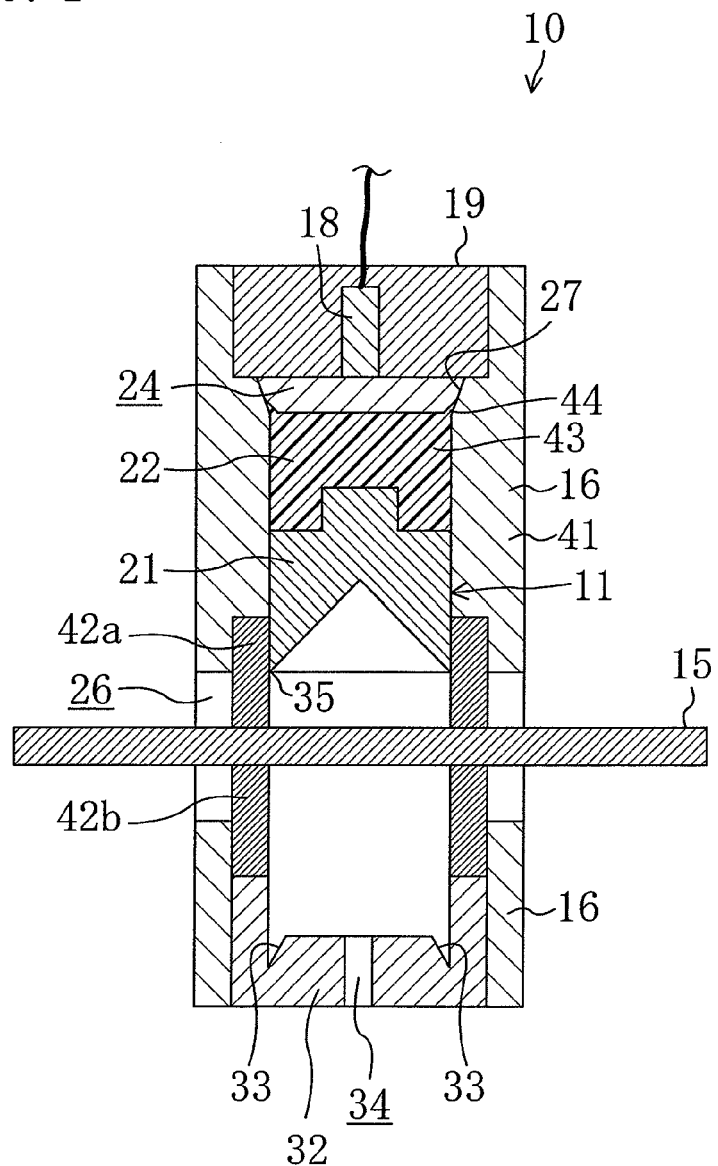
FIG. 4 is a longitudinal sectional view of a cutting apparatus according to a second embodiment.

Like the first embodiment, the second embodiment is a cutting apparatus (10) according to the present invention. As shown in FIG. 4, the cutting apparatus (10) of the second embodiment includes a blade (11), a cylindrical case (16), a blade stop portion (32), and an ignition portion (18). The ignition portion (18) is formed by a blasting cap. The cutting apparatus (10) is configured to advance the blade (11) by using a high pressure gas generated by detonation of a gas generating agent (an explosive) in a gas generating chamber (24) that is formed on the base end side of the blade (11) in the cylindrical case (16).

Note that, in the description of the second embodiment, one end of the cutting apparatus (10) refers to the end located on the upper side of the figure, and the other end of the cutting apparatus (10) refers to the end located on the lower side of the figure. The same applies to modifications described below.

The blade (11) has a substantially columnar shape. The blade (11) includes a cutting portion (21) made of a metal, and an insulating portion (22) made of an insulating material (e.g., a resin such as Nylon (Registered Trademark) 66). The cutting portion (21) has a blade portion configured to cut a current-carrying member (15) such as an electrical wire.

The cutting portion (21) has a columnar shape. The outer diameter of the cutting portion (21) is axially constant. The cutting portion (21) has a conically recessed top end face, and the entire circumference of the top end face serves as a cutting edge (35) of the blade portion. The cutting edge of the cutting portion (21) has a circular shape as viewed axially. The base end face of the cutting portion (21) has a protrusion that fits in a recess of the insulating portion (22).

The insulating portion (22) is provided on the base end side of the cutting portion (21). The insulating portion (22) includes a columnar insulating portion main body (43) and a tapered portion (44). The tapered portion (44) protrudes outward beyond the outer peripheral surface of the insulating portion main body (43) to form a sealing protruding portion (44). The outer diameter of the insulating portion main body

(43) is axially constant, and is equal to that of the cutting portion (21). The recess is formed in the end face located on the cutting portion (21) side of the insulating portion main body (43), so that the protrusion of the cutting portion (21) fits in the recess. The insulating portion main body (43) is fixed to the base end face of the cutting portion (21) with, e.g., an adhesive or the like. The insulating portion main body (43) is coaxial with the cutting portion (21).

The tapered portion (44) is provided along the entire circumference of the base end face of the insulating portion main body (43). The tapered portion (44) protrudes obliquely outward from the base end face of the insulating portion main body (43). The tapered portion (44) has a pointed tip, and the thickness of the tapered portion (44) increases toward its base end. The diameter of the tip of the tapered portion (44) is larger than that of the outer surface of the insulating portion main body (43).

The cylindrical case (16) has a cylindrical shape. The outer diameter of the cylindrical case (16) is axially constant. The cylindrical case (16) includes a case main body (41) made of a metal, an insulating case insulating portion (42), and a disc-shaped lid member (19). Placing holes (26), which are configured to insert therethrough the current-carrying member (15) to be cut, are formed in the case main body (41). The case insulating portion (42) covers a region surrounding the placing hole (26) in the inner surface of the case main body (41). The lid member (19) closes one end of the case main body (41). The case main body (41) and the case insulating portion (42) are separate members. The ignition portion (18) is attached to the lid member (19).

A lid attaching portion configured to attach the lid member (19) thereto, a blade accommodating portion configured to accommodate most of the blade (11), a placing-hole formation portion where the placing holes (26) are formed, and a blade-stop attaching portion configured to attach the blade stop portion (32) thereto are sequentially formed in the case main body (41) in this order from one end of the case main body (41). A stepped portion is formed between the lid attaching portion and the blade accommodating portion so that the inner face of the lid member (19) contacts the stepped portion. Another stepped portion is formed between the blade accommodating portion and the placing-hole formation portion so that one end face of the case insulating portion (42) contacts the stepped portion. The inner diameter of the case main body (41) is the smallest in the blade accommodating portion, and is the same in the remaining part of the case main body (41). Note that the inner peripheral surface of the lid attaching portion is threaded so as to mate with a threaded outer peripheral surface of the lid member (19) (not shown). The inner peripheral surface of the blade-stop attaching portion is threaded so as to mate with a threaded outer peripheral surface of the blade stop portion (32) (not shown).

A tapered surface is formed at one end of the blade accommodating portion so that the inner diameter of the one end of the blade accommodating portion increases toward the lid attaching portion. The tapered surface is formed along the entire circumference of the one end of the blade accommodating portion. In the case main body (41), the portion having the tapered surface forms a blade holding portion (27), on which the tapered portion (44) of the insulating portion (22) of the blade (11) fits before the blade (11) advances. Before the blade (11) advances, the blade (11) is held by the blade holding portion (27) even if the cutting apparatus (10) is excited to some extent.

Two placing holes (26) are formed in the placing-hole formation portion of the case main body (41). The two placing holes (26) are formed symmetrically with respect to the central axis of the case main body (41) so as to face each other. The placing holes (26) are circular through holes. The current-carrying member (15) to be cut is placed in the cylindrical case (16) by insertion through both placing holes (26).

The case insulating portion (42) is formed by a pair of fixing members (42a, 42b), which are configured to hold the current-carrying member (15) therebetween. The two fixing members (42a, 42b) have a cylindrical shape, and have the same shape and the same size. The two fixing members (42a, 42b) are fitted in the inner side of the placing-hole formation portion of the case main body (41). The outer diameter of the fixing members (42a, 42b) is approximately equal to the inner diameter of the placing-hole formation portion. The inner diameter of the fixing members (42a, 42b) is approximately equal to that of the blade accommodating portion. Thus, in the cylindrical case (16), there is almost no difference in level between the inner surface of the blade accommodating portion of the case main body (41) and the inner surface of each fixing member (42a, 42b).

The blade stop portion (32) has a substantially disc shape. The blade stop portion (32) is made of a material (e.g., soft iron) that is softer than that of the cutting portion (21). The blade stop portion (32) is attached so as to close the other end of the case main body (41). The outer periphery of one end face of the blade stop portion (32) protrudes in a cylindrical shape, and the outer peripheral surface of the protruding part is threaded so as to mate with the threaded inner peripheral surface of the blade-stop attaching portion (not shown).

A circular fitting groove (33) is formed in the blade stop portion (32). The fitting groove (33) has a V-shaped cross section. The fitting groove (33) has a tapered inner wall surface formed so that the fitting groove (33) tapers toward its bottom. The outer wall surface of the fitting groove (33) is a cylindrical surface whose diameter is axially constant. The diameter of the bottom of the fitting groove (33) is equal to that of the cutting edge of the blade (11). That is, the fitting groove (33) has a circular shape corresponding to the shape of the cutting edge of the cutting portion (21). The angle between the wall surfaces of the fitting groove (33) is narrower than the angle of the cutting edge of the cutting portion (21). A through hole (34) is formed in the center of the blade stop portion (32).

In the second embodiment, when hitting the fitting groove (33), the cutting portion (21) of the blade (11) increases the angle between the wall surfaces of the fitting groove (33), whereby the cutting portion (21) is held in the fitting groove (33). This prevents the blade (11) from rebounding after hitting the blade stop portion (32).

A method for assembling the cutting apparatus (10) will be briefly described below. When assembling the cutting apparatus (10), the blade (11) is first inserted from one end of the cylindrical case (16). The blade (11) is inserted to the position where the tapered portion (44) of the insulating portion (22) fits in the blade holding portion (27). Next, the two fixing members (42a, 42b) are sequentially inserted from the other end of the case main body (41), and then the blade stop portion (32) is screwed in the case main body (41). Thereafter, a space, which is located on the base end side of the blade (11), is filled with an explosive, and then the lid member (19) is screwed in the case main body (41). In the cutting apparatus (10), the space filled with the explosive serves as the gas generating chamber (24).

In the cutting apparatus (10) of the second embodiment, the current-carrying member (15) to be cut is inserted through the two placing holes (26) so as to extend between the two fixing members (42a, 42b). For example, a long plate-shaped cable wire (15) is inserted through the placing holes (26) (see FIG.

Figure 5:
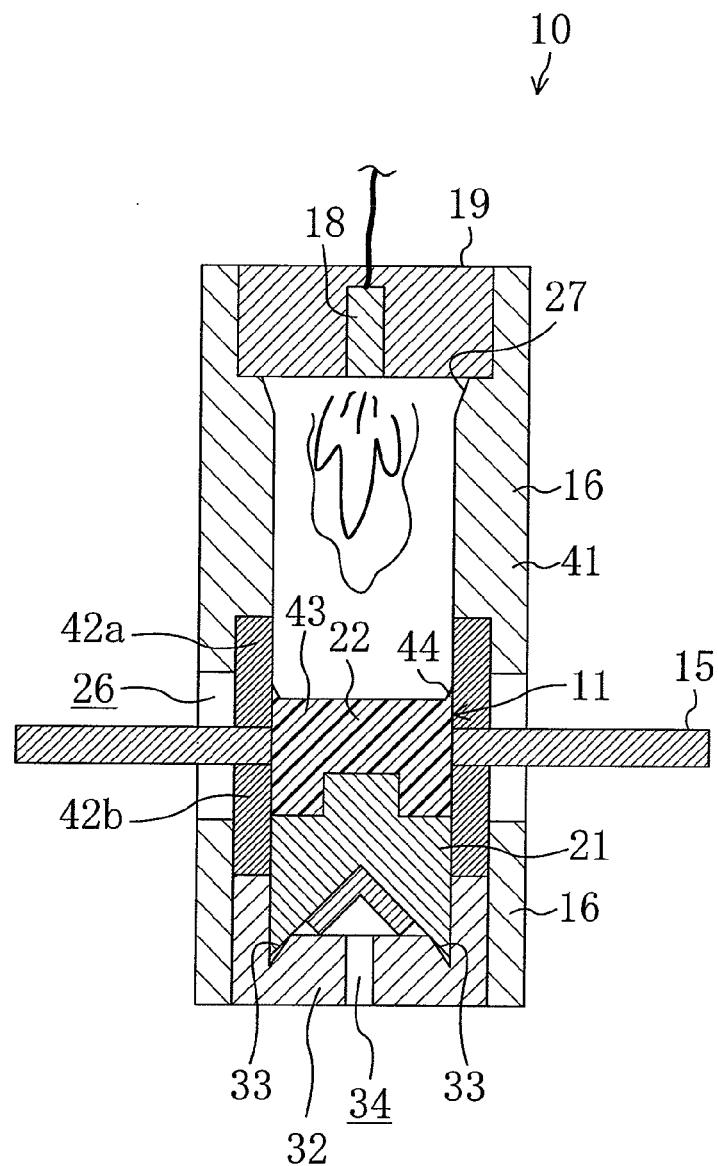
FIG. 5 is a longitudinal sectional view of the cutting apparatus of the second embodiment after a blade has advanced.

9). The current-carrying member (15) to be cut is held between, and fixed by, the two fixing members (42a, 42b). If the ignition portion (18) is operated in this state, the explosive in the gas generating chamber (24) is detonated, generating a high pressure gas. The pressure of the high pressure gas is applied to the base end face of the blade (11), whereby the blade (11) advances in the direction toward its cutting edge. The cutting portion (21), which is made of a metal, instantaneously cuts (breaks) the current-carrying member (15). The blade (11) further advances, and as shown in FIG. 5, stops with the blade portion of the cutting portion (21) fitting in the fitting groove (33). In this state, the outer peripheral surface of the insulating portion main body (43) of the insulating portion (22) is in contact with the cut faces of the current-carrying member (15).

Note that the cutting portion (21) hits the blade stop portion (32) after cutting the current-carrying member (15). When hitting the fitting groove (33), the cutting portion (21) increases the angle between the wall surfaces of the fitting groove (33), whereby the cutting portion (21) is held in the fitting groove (33).

As the blade (11) advances, the tapered portion (44) of the insulating portion (22) is pressed against the inner surface of the case main body (41), and is deformed inward. The outer surface of the tapered portion (44) is continuously in close contact with the inner surface of the cylindrical case (16) during advancing movement of the blade (11). After the blade (11) advances, the outer surface of the tapered portion (44) is in close contact with the inner surface of the fixing member (42a) that is located on the gas generating chamber (24) side of the current-carrying member (15). This prevents a gas generated in the gas generating chamber (24) from reaching the vicinity of the cut faces of the current-carrying member (15) through the gap between the inner surface of the cylindrical case (16) and the outer surface of the insulating portion (22).

[Advantages of the Second Embodiment]

In the second embodiment, the insulating portion (22), which is subjected to a smaller force than the cutting portion (21) and does not delaminate like a coating film, eventually contacts the cut faces of the current-carrying member (15). Thus, the cutting portion (21), which is made of a metal, does not contact the cut faces of the current-carrying member (15) after the blade (11) advances, whereby electricity can be reliably prevented from flowing between the cut pieces of the current-carrying member (15).

In the second embodiment, the placing holes (26), which are configured to place therein the current-carrying member (15) to be cut, are formed in the cylindrical case (16) configured to accommodate the blade (11). Thus, the current-carrying member (15) to be cut can be easily placed at a predetermined position by merely inserting the current-carrying member (15) through the placing holes (26).

According to the second embodiment, the pair of fixing members (42) prevent the cut pieces of the current-carrying member (15) from contacting the case main body (41) that is made of a metal. This can prevent electricity from flowing between the cut pieces of the current-carrying member (15) via the case main body (41) made of a metal.

In the second embodiment, the pair of fixing members (42) serve not only to prevent the cut pieces of the current-carrying member (15) from contacting the case main body (41) made of a metal, but also to fix the current-carrying member (15). This eliminates the need to separately provide a member configured to fix the current-carrying member (15), whereby the configuration of the cutting apparatus (10) can be simplified.

According to the second embodiment, the tapered portion (44) prevents a gas generated in the gas generating chamber (24) from reaching the vicinity of the cut faces of the current-carrying member (15) through the gap between the inner surface of the cylindrical case (16) and the outer surface of the insulating portion (22). This can prevent electricity from flowing between the current-carrying member (15) and the cylindrical case (16) via the gas generated in the gas generating chamber (24) and a conductive product produced in the gas generating chamber (24).

Incidentally, in the case of the sealing member (23) of the first embodiment, the blade (11) needs to be pressed into the sealing member (23) when attaching the blade (11), and the sealing member (23) can be damaged at this time. On the other hand, in the second embodiment, almost no force is applied to the tapered portion (44) when inserting the blade (11) from one end of the cylindrical case (16). This can prevent or reduce damage to the tapered portion (44) when attaching the blade (11).

In the second embodiment, the pressure of a high pressure gas is applied to the inner peripheral surface of the tapered portion (44) when the blade (11) advances. That is, the tapered portion (44) is pressed against the inner surface of the cylindrical case (16) by the high pressure gas. Thus, the tapered portion (44) of the second embodiment is capable of providing high sealing capability.

In the second embodiment, the blade holding portion (27) is formed so that the tapered portion (44) of the insulating portion (22) fits therein before the blade (11) advances. Thus, the blade (11) is held by the blade holding portion (27) even if the cutting apparatus (10) is excited. This can prevent or reduce displacement of the blade (11) from a predetermined position, where the blade (11) should be located before advancing, before the cutting apparatus (10) operates.

In the second embodiment, the cutting edge of the blade portion of the cutting portion (21) is held in the fitting groove (33) after cutting the current-carrying member (15). Thus, the blade (11) does not rebound after hitting the blade stop portion (32). This can prevent electricity from flowing between the cut pieces of the current-carrying member (15) via the cutting portion (21).

In the second embodiment, the fitting groove (33) extends in a circular shape corresponding to the shape of the cutting edge of the blade portion of the cutting portion (21). Thus, the cutting edge of the cutting portion (21) fits in the fitting groove (33) even if the cutting portion (21) rotates. Thus, no adjustment in the rotation direction is required when attaching the cutting portion (21) and the blade stop portion (32), thereby facilitating the operation of attaching the cutting portion (21) and the blade stop portion (32).

In the case where the cutting apparatus (10) can be excited, such as, e.g., the case where the cutting apparatus (10) is placed in an automobile, the cutting portion (21) can rotate due to vibration. According to the second embodiment, the cutting edge of the cutting portion (21) fits in the fitting groove (33) even if the cutting portion (21) rotates. Thus, the blade (11) can be reliably advanced to a predetermined advanced position where the insulating portion (22) insulates the cut pieces of the current-carrying member (15) from each other.

(First Modification of the Second Embodiment)

Figure 6:
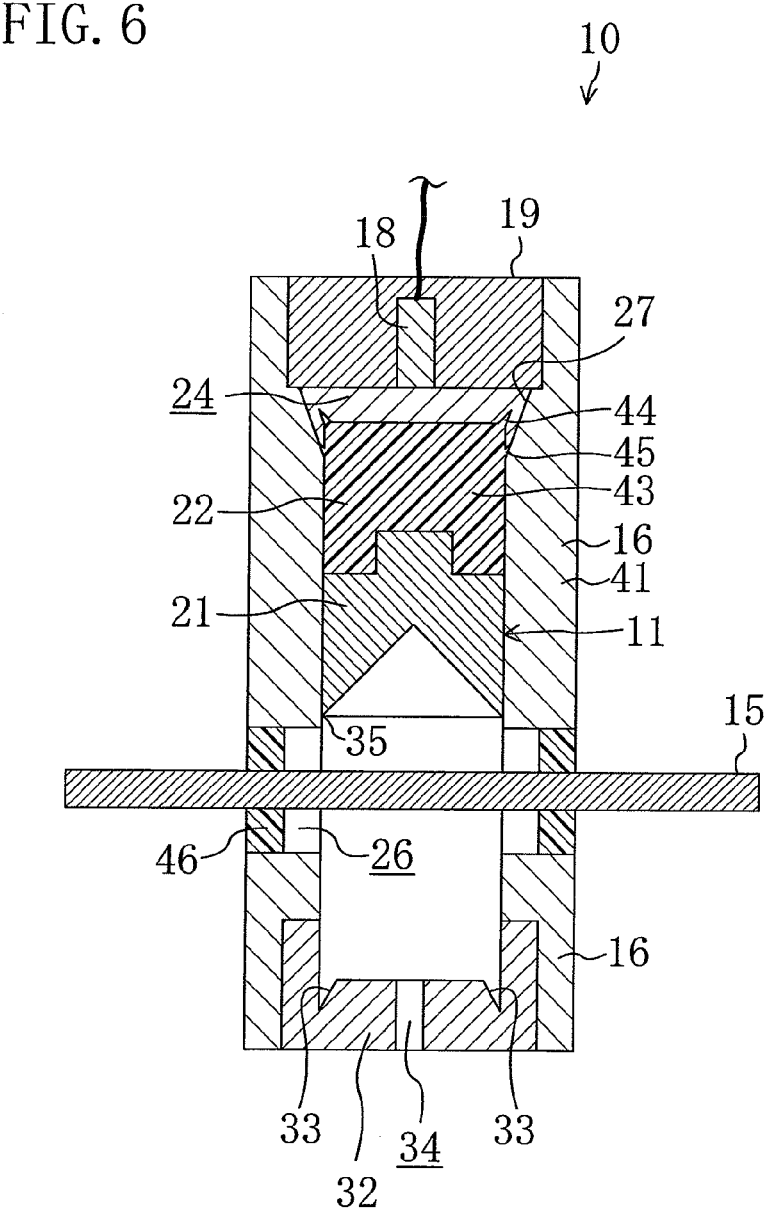
FIG. 6 is a longitudinal sectional view of a cutting apparatus according to a first modification of the second embodiment.

A first modification of the second embodiment will be described below. In the first modification, as shown in FIG. 6, two tapered portions (44, 45) are sequentially formed in the insulating portion (22) of the blade (11) in this order from one end of the insulating portion (22). In the first modification, the first tapered portion (44), which is located on one end side, forms a sealing protruding portion (44), and the second tapered portion (45), which is located on the other end side, forms a latching protruding portion (45). Instead of the pair of fixing members (42a, 42b), two insulating rings (46), which form an insulating member (46), are provided in the placing holes (26).

Specifically, the first tapered portion (44) is the same as the tapered portion (44) of the second embodiment. On the other hand, the second tapered portion (45) protrudes obliquely outward from a position close to one end of the outer peripheral surface of the insulating portion main body (43). The second tapered portion (45) has a pointed tip, and the thickness of the second tapered portion (45) increases toward its base end. The second tapered portion (45) has tapered inner and outer surfaces formed so that the second tapered portion (45) is tapered toward its one end. The diameter of the tip of the second tapered portion (45) is larger than that of the outer surface of the insulating portion main body (43).

The insulating rings (46) are made of an insulating material. Each insulating ring (46) is fitted in the placing holes (26) with the current-carrying member (15) inserted through the placing holes (26). Each insulating ring (46) is interposed between the current-carrying member (15) and the respective peripheral side surfaces of the placing holes (26). The insulating rings (46) prevent the cut pieces of the current-carrying member (15) from contacting the respective peripheral side surfaces of the placing holes (26). The insulating rings (46) are made of an elastic material, and hold the current-carrying member (15).

In the first modification, the blade (11) is inserted to the position where the second tapered portion (45) of the insulating portion (22) fits in the blade holding portion (27). Thus, before the blade (11) advances, the second tapered portion (45) is caught by the blade holding portion (27). Thus, the blade (11) is held by the blade holding portion (27) even if the cutting apparatus (10) is excited.

Figure 7:
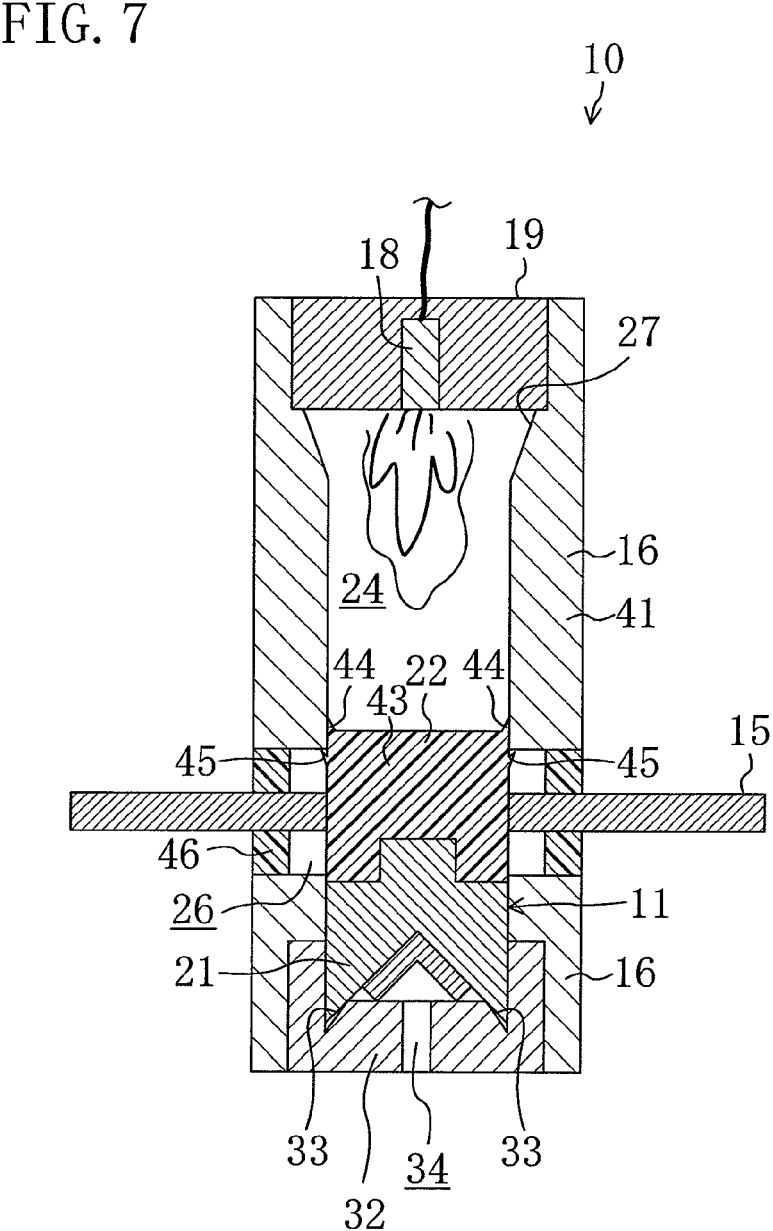
FIG. 7 is a longitudinal sectional view of the cutting apparatus of the first modification of the second embodiment after a blade has advanced.

As shown in FIG. 7, after the blade (11) advances, the second tapered portion (45) fits in the placing holes (26). Thus, even if the blade (11) rebounds after hitting the blade stop portion (32), the second tapered portion (45) is caught by the respective peripheral side surfaces of the placing holes (26). Moreover, the blade (11) is pressed in the direction toward the other end of the blade (11) by a high pressure gas that is applied to one end of the blade (11). Thus, the blade (11) does not rebound so much as to cause the cutting portion (21) to return to the position between the cut pieces of the current-carrying member (15). This can prevent electricity from flowing between the cut pieces of the current-carrying member (15) via the cutting portion (21). Note that the second tapered portion (45) need not necessarily be provided along the entire circumference of the insulating portion main body (43), and may be provided only at the positions respectively corresponding to the placing holes (26).

According to the first modification, the insulating rings (46) prevent the cut pieces of the current-carrying member (15) from contacting the case main body (41). This can prevent electricity from flowing between the cut pieces of the current-carrying member (15) via the case main body (41).

Note that, instead of providing the insulating rings (46), the respective peripheral side surfaces of the placing holes (26) of the case main body (41) may be coated with an insulating material. In this case, regions surrounding the placing holes (26) in the inner surface of the case main body (41) may also be coated with an insulating material. Alternatively, only the regions surrounding the placing holes (26) in the inner surface of the case main body (41) may be coated with an insulating material.

Note that the second tapered portion (45) may be configured so as not to fit in the placing holes (26) after the blade (11) advances. In this case, the second tapered portion (45), together with the first tapered portion (44), forms the sealing protruding portion (44).

Three or more tapered portions (44, 45) may be formed in the insulating portion (22). In this case, all the tapered portions (44, 45) may form the sealing protruding portion (44), or the tapered portion (44, 45) located on the other end side may form the latching protruding portion (45).

(Second Modification of the Second Embodiment)

Figure 8:
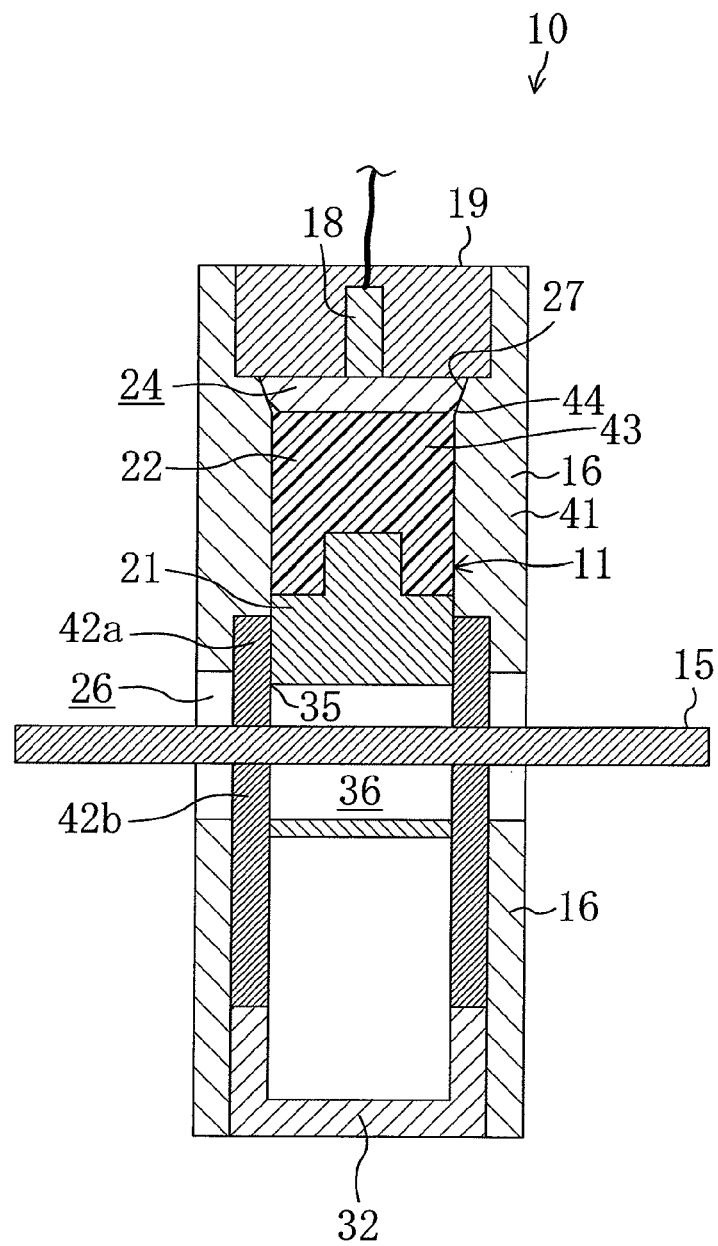
FIG. 8 is a longitudinal sectional view of a cutting apparatus according to a second modification of the second embodiment taken along the longitudinal direction of a current-carrying member.
Figure 9:
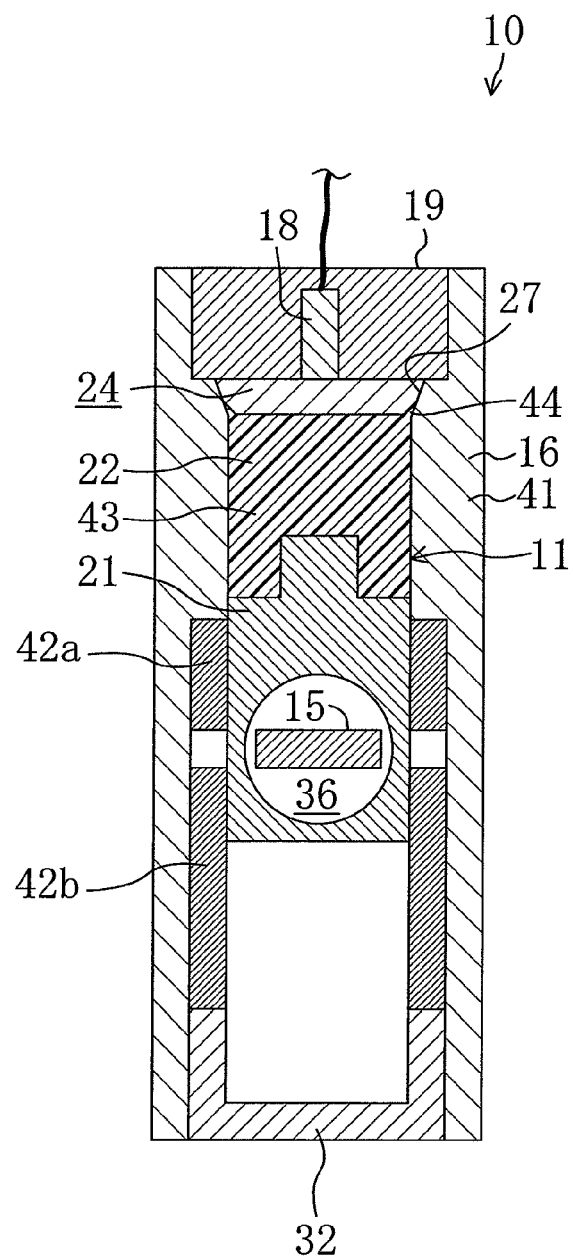
FIG. 9 is a longitudinal sectional view of the cutting apparatus of the second modification of the second embodiment taken along the lateral direction of the current-carrying member.

A second modification of the second embodiment will be described below. As shown in FIGS. 8 and 9, the second modification is different from the second embodiment in the shape of the cutting portion (21).

The cutting portion (21) has a columnar shape with a flat top end face. An insertion portion (36), which is configured to insert the current-carrying member (15) therethrough, is formed in the cutting portion (21). The insertion portion (36) is formed by a circular through hole that extends radially through the cutting portion (21). Both ends of the insertion portion (36) are open to the side surface of the cutting portion (21). A part of the cutting portion (21), which adjoins the insertion portion (36) on the side (one end side) opposite to the side to which the blade (11) advances, serves as a blade portion configured to cut the current-carrying member (15). The blade portion is formed by the peripheral side surface of the insertion portion (36) extending perpendicularly to the axis.

Figure 10:
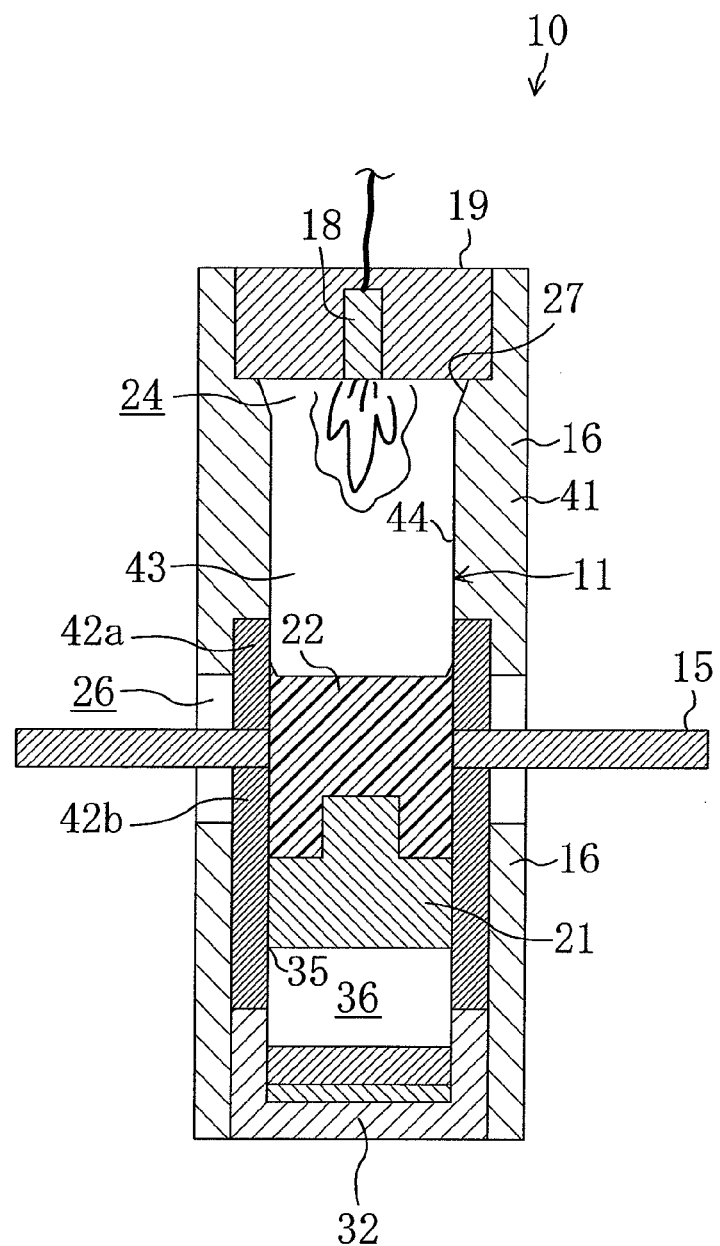
FIG. 10 is a longitudinal sectional view of the cutting apparatus of the second modification of the second embodiment after a blade has advanced.

The blade (11) is inserted to the position where the tapered portion (44) of the insulating portion (22) fits in the blade holding portion (27), so that both ends of the insertion portion (36) face the placing holes (26), respectively. In this state, the outer peripheral surface of the cutting portion (21) faces the respective inner peripheral surfaces of both fixing members (42a, 42b). As shown in FIG. 10, when the blade (11) is advanced, the current-carrying member (15) is cut by the blade portion located on one end side of the insertion portion (36), and the blade (11) stops with the outer peripheral surface of the insulating portion main body (43) of the insulating portion (22) being in contact with the cut faces of the current-carrying member (15).

In the second modification, the outer peripheral surface of the cutting portion (21) faces also the inner peripheral surface of the fixing member (42b), which is located on the side (the other end side) to which the blade (11) advances, before the blade (11) advances. Thus, even if a placement error occurs when placing the pair of fixing members (42a, 42b), the blade portion of the cutting portion (21) does not hit the end face of this fixing member (42b) during advancing movement of the blade (11). This enables the blade (11) to be reliably advanced to a predetermined advanced position where the insulating portion (22) insulates the cut pieces of the insulating member (15) from each other, regardless of the placement error of the pair of fixing members (42a, 42b).

In the second modification, the blade portion of the cutting portion (21), which faces one end side of the insertion portion (36), extends in a semicircular shape as viewed in the longitudinal direction of the current-carrying member (15). In the case where the blade portion of the cutting portion (21) extends straight in the lateral direction of the current-carrying member (15) as viewed in the longitudinal direction of the current-carrying member (15) (e.g., in the case where the insertion portion (36) is formed by a rectangular through hole), the blade portion of the cutting portion (21) horizontally enters the surface on one end side of the current-carrying member (15). Thus, the cutting resistance of the current-carrying member (15) is relatively large. On the other hand, in the second modification, the blade portion of the cutting portion (21) obliquely enters the surface on the one end side of the current-carrying member (15). Thus, the cutting resistance of the current-carrying member (15) is relatively small.

Figure 11:
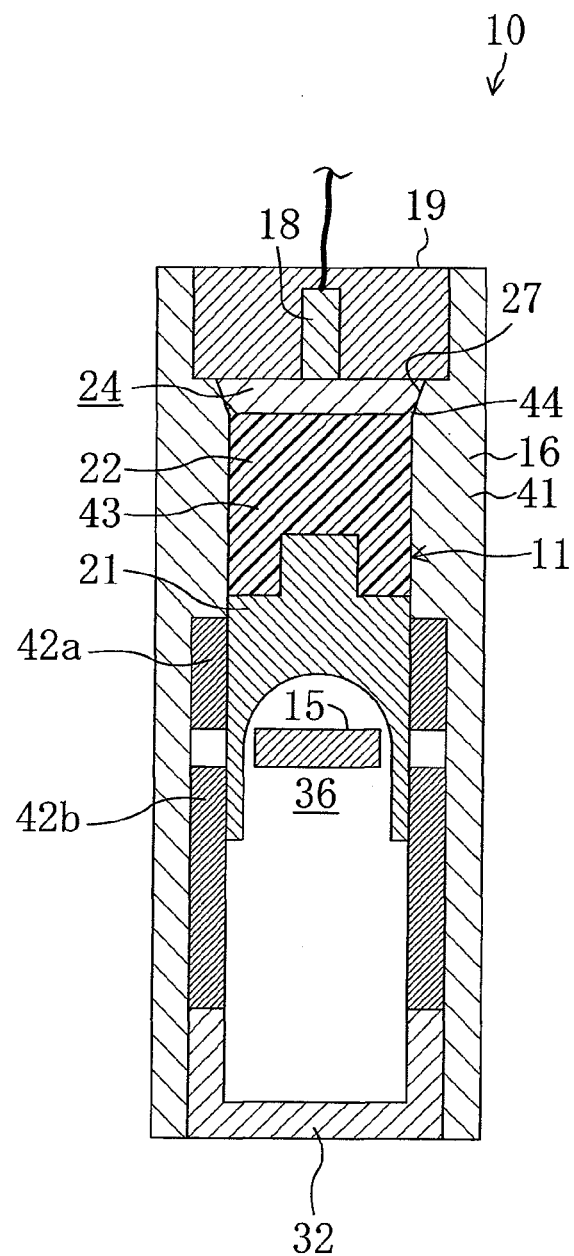
FIG. 11 is a longitudinal sectional view of another form of the cutting apparatus of the second modification of the second embodiment.

Note that, as shown in FIG. 11, the insertion portion (36) may be formed by a cut-out that extends radially in the cutting portion (21). The insertion portion (36) is cut out from the top end face of the cutting portion (21).

In order for the cutting portion (21) to fit in the blade stop portion (32) after cutting the current-carrying member (15), the blade stop portion (32) may be formed so that the inner diameter of the cylindrical portion, which protrudes in the outer periphery of one end of the blade stop portion (32), reduces toward the other end. The cylindrical portion has a tapered inner peripheral surface formed so that the horizontal thickness of the cylindrical portion increases toward the other end. The inner diameter of the one end of the cylindrical portion is larger than the outer diameter of the cutting portion (21), and the inner diameter of the other end of the cylindrical portion is smaller than the outer diameter of the cutting portion (21). With this configuration, when hitting the blade stop portion (32), the cutting portion (21) widens the cylindrical portion of the blade stop portion (32) that is made of a material softer than the cutting portion (21), whereby the cutting portion (21) is held in the cylindrical portion of the blade stop portion (32). Note that the cylindrical portion is a portion whose outer peripheral surface is threaded so as to mate with a threaded inner peripheral surface of the case main body (41).

A blade-shaped protruding portion may be provided in the top end face of the blade (11), and a V-shaped fitting groove may be provided in the blade stop portion (32) so that the protruding portion fits in the fitting groove. As in the second embodiment, a through hole (34) may be formed in the blade stop portion (32) so that the blade (11) can be pushed toward the other end by a high pressure gas that is applied to one end face of the blade (11).

(Third Modification of the Second Embodiment)

Figure 12:
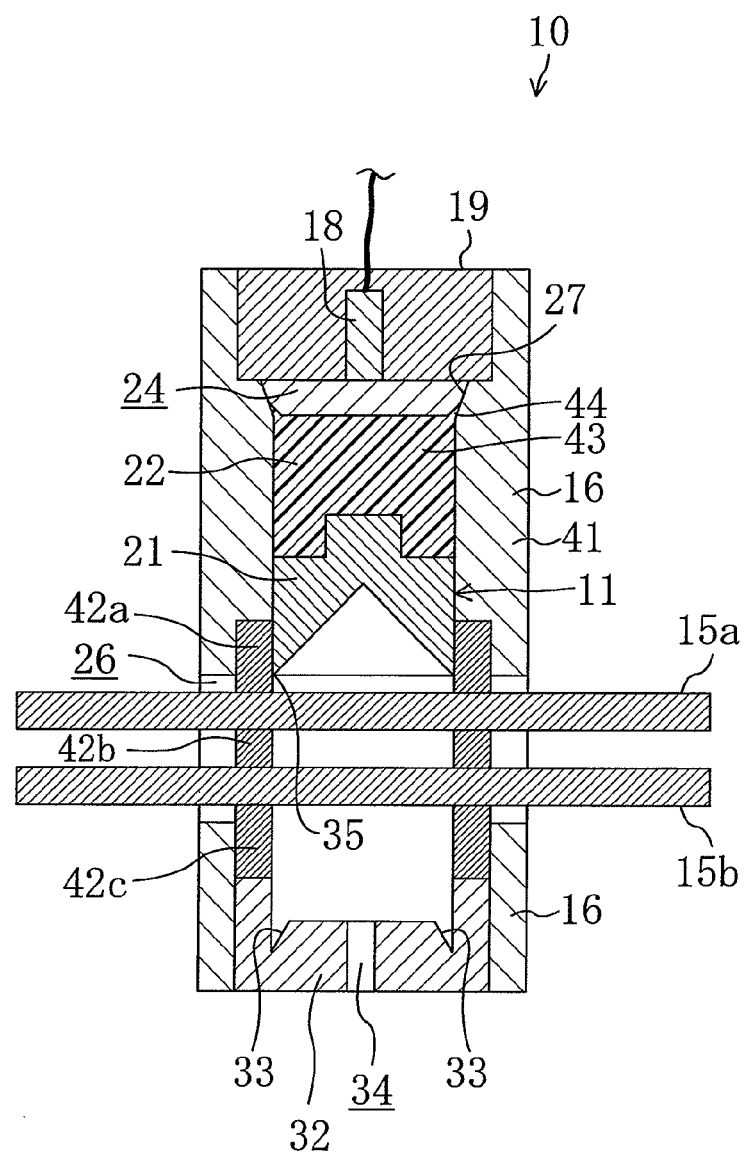
FIG. 12 is a longitudinal sectional view of a cutting apparatus according to a third modification of the second embodiment.

A third modification of the second embodiment will be described below. As shown in FIG. 12, a cutting apparatus (10) of the third modification is configured so as to be able to cut a plurality of (e.g., two) current-carrying members (15*a*, 15*b*). The case-insulating portion (42) is formed by three fixing members (42*a*, 42*b*, 42*c*) having the same inner diameter and the same outer diameter. The current-carrying member (15*a*) located on one end side is held between the fixing member (42*a*) located on one end side, and the fixing member (42*b*) located in the middle. The current-carrying member (15*b*) located on the other end side is held between the fixing member (42*b*) located in the middle, and the fixing member (42*c*) located on the other end side.

In the third modification, as the blade (11) advances, the blade (11) first cuts the current-carrying member (15*a*) located on one end side, and then cuts the current-carrying member (15*b*) located on the other end. Thereafter, the cutting edge of the cutting portion (21) fits into the fitting groove (33). The blade (11) stops with the outer peripheral surface of the insulating portion main body (43) of the insulating portion (22) being in contact with the cut faces of both current-carrying members (15*a*, 15*b*).

(Fourth Modification of the Second Embodiment)

A fourth modification of the second embodiment will be described below. A cutting apparatus (10) of the fourth modification is configured so as to be able to cut a plurality of (e.g., two) current-carrying members (15*a*, 15*b*), like the third modification of the second embodiment.

Figure 13:
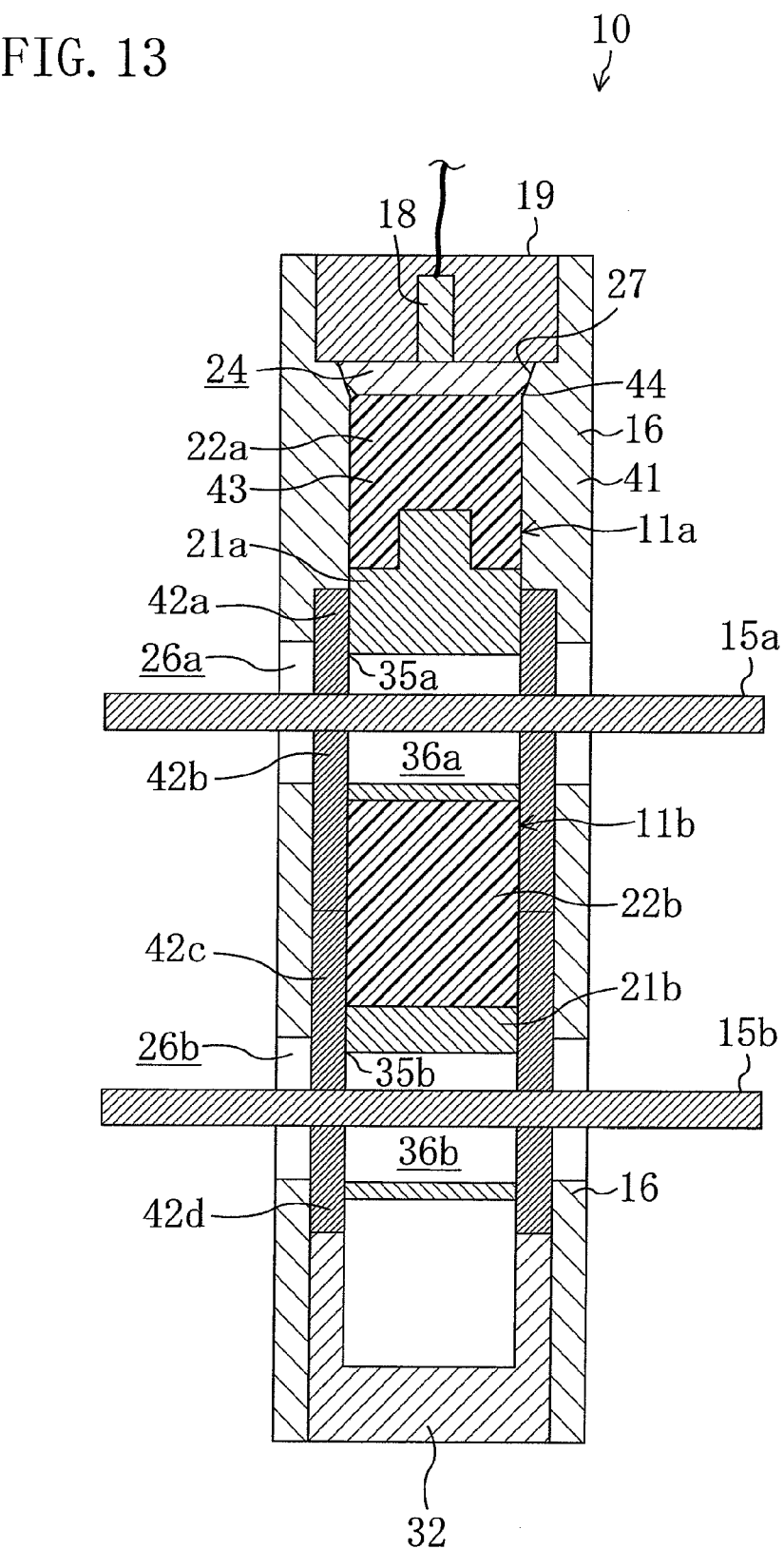
FIG. 13 is a longitudinal sectional view of a cutting apparatus according to a fourth modification of the second embodiment.

As shown in FIG. 13, a first blade (11*a*) and a second blade (11*b*) are accommodated in the cylindrical case (16). The first blade (11*a*) includes a first cutting portion (21*a*) and a first insulating portion (22*a*). The first blade (11*a*) has the same configuration as that of the blade (11) of the second modification of the second embodiment except that no tapered portion (44) is formed in the first insulating portion (22*a*). The current-carrying member (15*a*) located on one end side is inserted through an insertion portion (36*a*) of the first cutting portion (21*a*). On the other hand, the second blade (11*b*) includes a second cutting portion (21*b*) and a second insulating portion (22*b*). The second blade (11*b*) has the same configuration as that of the blade (11) of the second modification of the second embodiment. The current-carrying member (15*b*) located on the other end side is inserted through an insertion portion (36*b*) of the second cutting portion (21*b*).

In the fourth modification, when the explosive in the gas generating chamber (24) is detonated, the first blade (11*a*) and the second blade (11*b*) advance and simultaneously cut the current-carrying members (15), respectively. The first blade (11*a*) stops with the outer peripheral surface of the insulating portion main body (43) of the first insulating portion (22*a*) being in contact with the cut faces of the current-carrying member (15*a*) located on one end side. The second blade (11*b*) stops with the outer peripheral surface of the insulating portion main body (43) of the second insulating portion (22*b*) being in contact with the cut faces of the current-carrying member (15*b*) located on the other end side.

Figure 14:
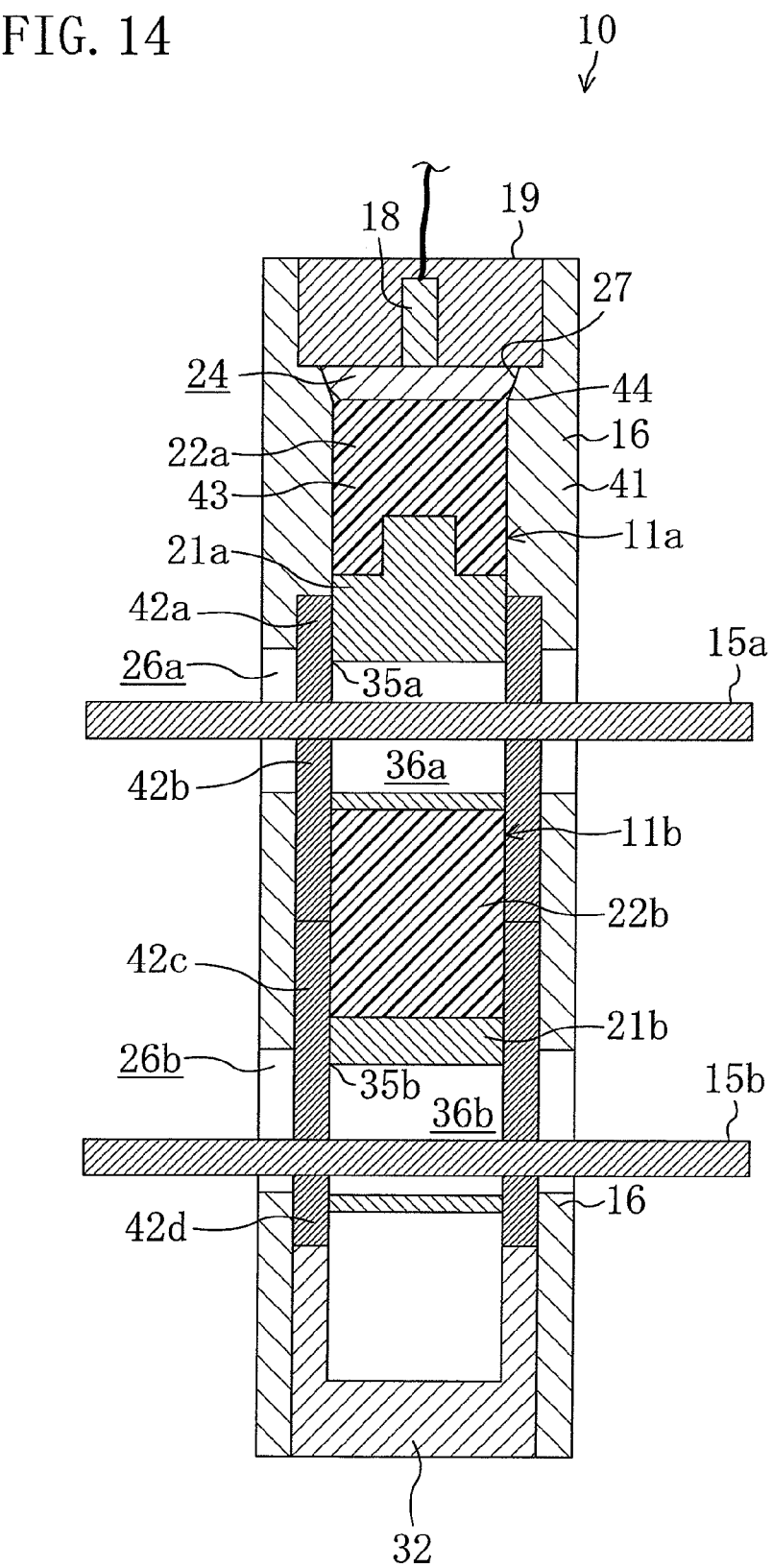
FIG. 14 is a longitudinal sectional view of another form of the cutting apparatus of the fourth modification of the second embodiment.

Note that, as shown in FIG. 14, the cutting apparatus (10) may be configured so that the first blade (11*a*) and the second blade (11*b*) cut the current-carrying members (15) at different timings, respectively. In the cutting apparatus (10) of FIG. 14, the height of the fixing member (42*c*) is increased, and the height of the fixing member (42*d*) is reduced, as compared to the cutting apparatus (10) of FIG. 13. The distance between the blade portion of the second blade (11*b*) and the current-carrying member (15*b*) located on the other end side is longer than that between the blade portion of the first blade (11*a*) and the current-carrying member (15*a*) located on one end side. In this case, the cutting resistance of the current-carrying members (15) is reduced as compared to the case where the first blade (11*a*) and the second blade (11*b*) simultaneously cut the current-carrying members (15), respectively.

(Fifth Modification of the Second Embodiment)

Figure 15:
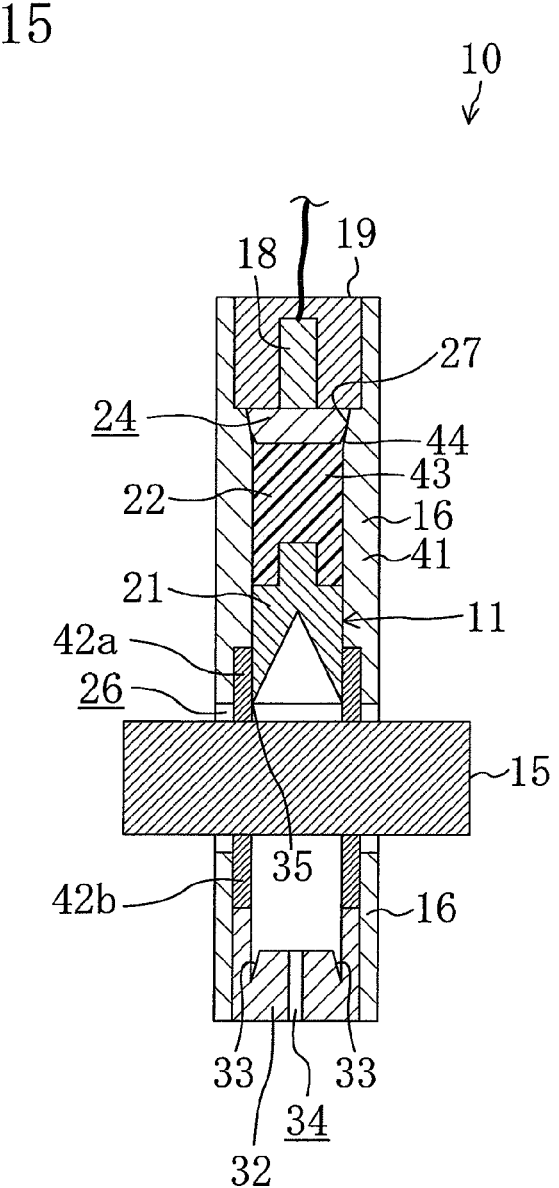
FIG. 15 is a longitudinal sectional view of a cutting apparatus according to a fifth modification of the second embodiment.
Figure 16:
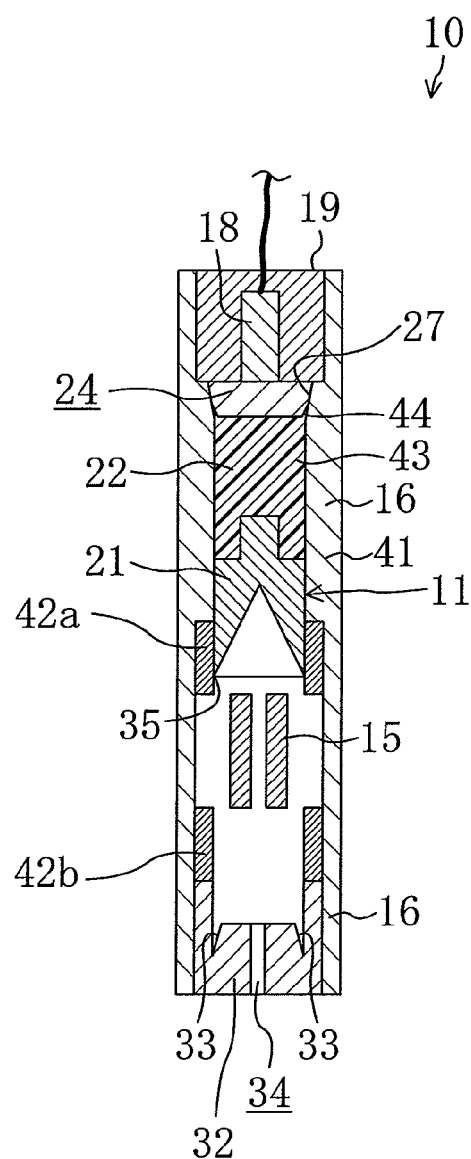
FIG. 16 is a longitudinal sectional view showing an example of cutting two current-carrying members by a cutting apparatus according to a sixth modification of the second embodiment.

A fifth modification of the second embodiment will be described below. In the fifth modification, as shown in FIG. 15, a long plate-shaped current-carrying member (15) is placed so that the lateral direction of the current-carrying member (15) extends in the longitudinal direction (the axial direction of the cylindrical case (16)). The diameter of the blade (11) is smaller than the width of the current-carrying member (15) to be cut. A cutting apparatus (10) of the fifth modification is more compact than the cutting apparatus (10) of the second embodiment. Note that, as shown in FIG. 16, the cutting apparatus (10) may cut a plurality of (e.g., two) current-carrying members (15).

Third Embodiment

A third embodiment of the present invention will be described below.

Figure 17:
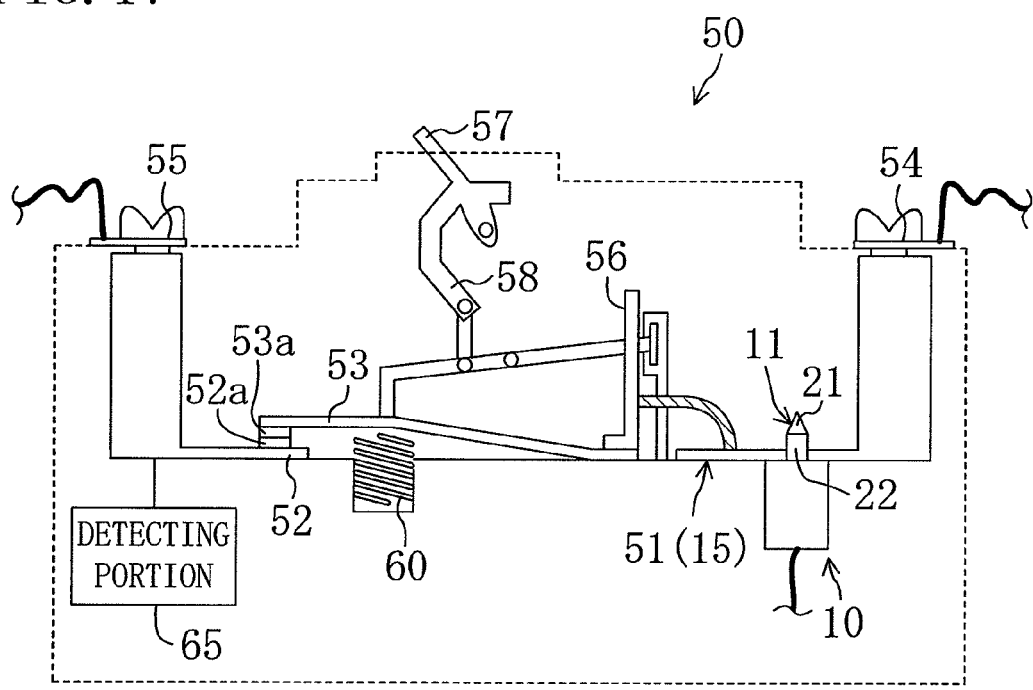
FIG. 17 is a schematic structural diagram of a breaker according to a third embodiment.

The third embodiment is a breaker (50) having a cutting apparatus (10) according to the present invention. As shown in FIG. 17, the breaker (50) includes a load terminal (55), a power supply terminal (54), and an inter-terminal member (51), which are provided in a resin casing (not shown). The inter-terminal member (51) is a member formed by a current-carrying member (15), and configured to connect the load terminal (55) and the power supply terminal (54).

The inter-terminal member (51) includes a fixed contact (52) connected to the load terminal (55), and a movable contact (53) connected to the power supply terminal (54). The movable contact (53) is provided so as to be movable between a contact position where the movable contact (53) contacts the fixed contact (52), and a non-contact position where the movable contact (53) is separated from the fixed contact (52). When the movable contact (53) moves to the contact position, a movable contact point (53a) of the movable contact (53) contacts a fixed contact point (52a) of the fixed contact (52).

The breaker (50) further includes: a link mechanism (58) configured to manually move the movable contact (53); a trip mechanism (56) configured to separate the movable contact (53) from the fixed contact (52) in the event of an abnormal current; and a bias spring (60) configured to bias the movable contact (53) away from the fixed contact (52). The link mechanism (58) is attached to the casing, and is configured so as to be able to move the movable contact (53) between the contact position and the non-contact position by operation of a manual lever (57). The trip mechanism (56) is formed by a bimetal member, and connects the movable contact (53) and the power supply terminal (54). The trip mechanism (56) is thermally deformed in the event of an overcurrent (an abnormal current), thereby moving the link mechanism (58) to separate the movable contact (53) from the fixed contact (52). The breaker (50) interrupts the current flow when the movable contact (53) is separated from the fixed contact (52).

The breaker (50) further includes the cutting apparatus (10) described above, and a welding detecting portion (65) configured to detect when the movable contact point (53a) and the fixed contact point (52a) are welded together. Note that any of the cutting apparatuses (10) of the first embodiment, the second embodiment, and other embodiments described below may be used as the cutting apparatus (10).

The cutting apparatus (10) is positioned so as to be able to cut the inter-terminal member (51). Specifically, the cutting apparatus (10) is provided on the back side of the inter-terminal member (51) (the lower side in FIG. 17).

The welding detecting portion (65) is connected to, e.g., the inter-terminal member (51), and is configured so as to detect if the movable contact point (53a) and the fixed contact point (52b) are welded together or not, based on the current value of the inter-terminal member (51). The ignition portion (18) of the cutting apparatus (10) is connected to the welding detecting portion (65). The welding detecting portion (65) is configured so as to operate the ignition portion (18) when it determines that the movable contact point (53a) and the fixed contact point (52a) are welded together.

In the third embodiment, when the welding detecting portion (65) determines that the movable contact point (53a) and the fixed contact point (52a) are welded together, the welding detecting portion (65) operates the ignition portion (18) to detonate the explosive, whereby the blade (11) advances. After cutting (breaking) the inter-terminal member (51), the blade (11) stops with the insulating portion (22) being in contact with the cut faces of the inter-terminal member (51). Thus, the cut faces of the inter-terminal member (51) are insulated from each other, thereby interrupting the current flow between the power supply terminal (54) and the load terminal (55).

[Advantages of the Third Embodiment]

The third embodiment is capable of forcibly interrupting the current flow between the power supply terminal (54) and the load terminal (55) by the cutting apparatus (10). Thus, even if, e.g., the movable contact (53) and the fixed contact (52) are welded together, the current flow between the power supply terminal (54) and the load terminal (55) is forcibly interrupted by the cutting apparatus (10), whereby failures of load equipments can be prevented.

Fourth Embodiment

A fourth embodiment of the present invention will be described below.

Figure 18:
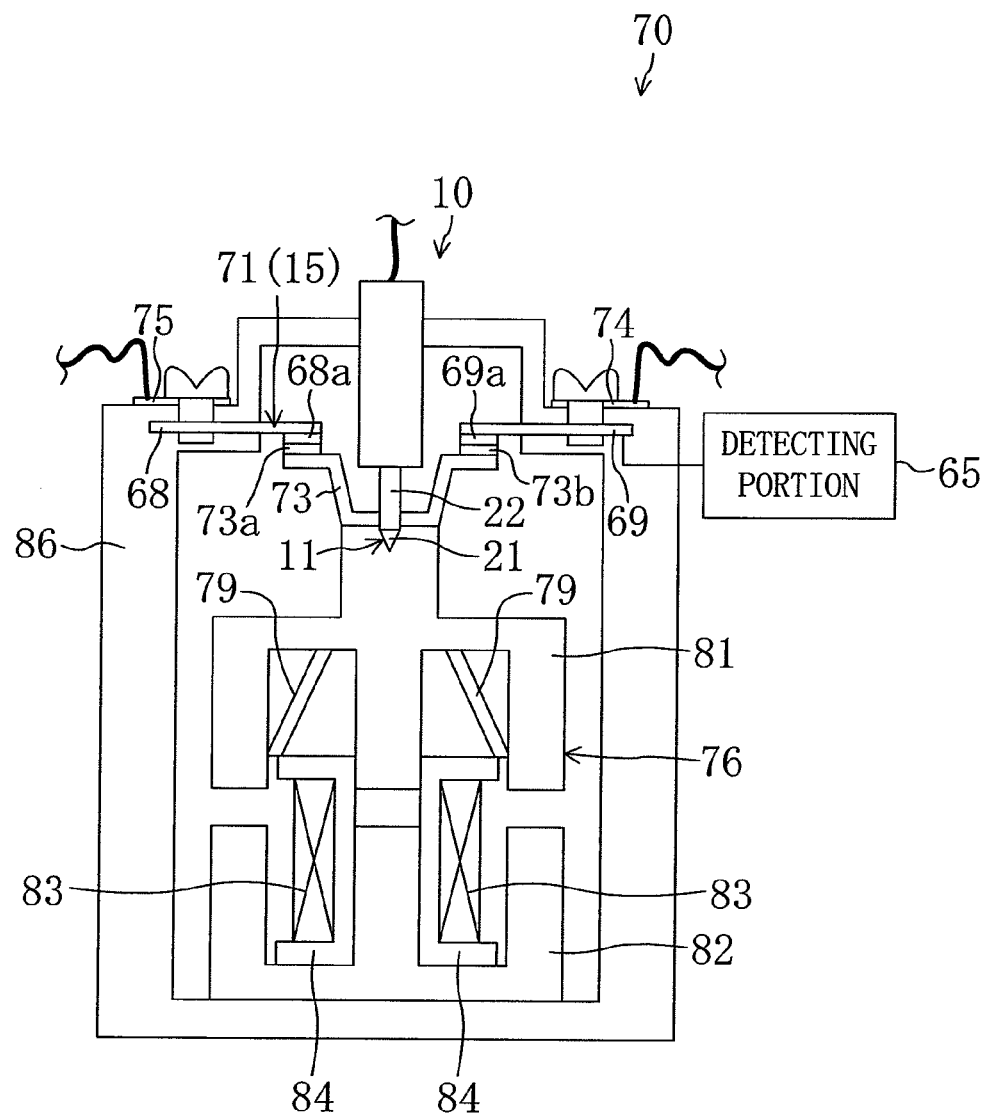
FIG. 18 is a schematic structural diagram of a contactor according to a fourth embodiment.

The fourth embodiment is a contactor (70) having a cutting apparatus (10) according to the present invention. As shown in FIG. 18, the contactor (70) includes a load terminal (75), a power supply terminal (74), and an inter-terminal member (71), which are provided in a resin casing (86). The inter-terminal member (71) is formed by a current-carrying member (15) configured to connect the load terminal (75) and the power supply terminal (74).

The inter-terminal member (71) includes a first fixed contact (68) connected to the load terminal (75), a second fixed contact (69) connected to the power supply terminal (74), and a movable contact (73) coupled to a movable iron core (81) described below. The movable contact (73) is provided so as to be movable between a contact position where the movable contact (73) contacts the pair of fixed contacts (68, 69), and a non-contact position where the movable contact (73) is separated from the pair of fixed contacts (68, 69). When the movable contact (73) moves to the contact position, a movable contact point (73a) at one end of the movable contact (73) contacts a first fixed contact point (68a) of the first fixed contact (68), and a movable contact point (73b) at the other end of the movable contact (73) contacts a second fixed contact point (69a) of the second fixed contact (69).

The contact (70) further includes a moving mechanism (76) configured to move the movable contact (73) between the contact position and the non-contact position. The moving mechanism (76) includes the movable iron core (81), a fixed iron core (82), an exciting coil (83), and a bobbin (84). The fixed iron core (82) is fixed to the bottom of the casing (86). The movable iron core (81) is provided so as to face the upper side of the fixed iron core (82). The exciting coil (83) is wound about the bobbin (84). A pair of return springs (79), which are configured to separate the movable iron core (81) and the fixed iron core (82) from each other during interruption of a current flow, are provided between the movable iron core (81) and the bobbin (84).

The moving mechanism (76) is configured so that the fixed iron core (82) is excited to attract the movable iron core (81) when a current is applied to the exciting coil (83) in response to an external signal. When the movable iron core (81) is attracted to the fixed iron core (82), the contactor (70) conducts electricity. On the other hand, the moving mechanism (76) is configured so that the movable iron core (81) is separated from the fixed iron core (82) by the return springs (79) when application of the current to the exciting coil (83) is stopped in response to an external signal. When the movable iron core (81) is separated from the fixed iron core (82), the contactor (70) interrupts the current flow.

The contactor (70) further includes the cutting apparatus (10) described above, and a welding detecting portion (65) similar to that of the third embodiment. Note that any of the cutting apparatuses (10) of the first embodiment, the second embodiment, and other embodiments described below can be used as the cutting apparatus (10).

The cutting apparatus (10) is positioned so as to be able to cut the inter-terminal member (71). Specifically, the cutting apparatus (10) is provided so that the blade portion of the blade (11) faces the front face of the movable contact (73)

before the blade (11) advances. A V-shaped fitting groove is formed in the movable iron core (81) at a position on the back side of the cutting location of the movable contact (73).

In the fourth embodiment, when the welding detecting portion (65) determines that the movable contact points (73a, 73b) and the fixed contact points (68a, 69a) are welded together, respectively, the welding detecting portion (65) operates the ignition portion (18) to detonate the explosive, whereby the blade (11) advances. After cutting the movable contact (73), the blade (11) stops while fitting in the fitting groove in the movable iron core (81). In this state, the insulating portion (22) of the blade (11) is in contact with the cut faces of the movable contact (73). That is, the blade (11) advances until the insulating portion (22) contacts the cut faces of the movable contact (73).

[Advantages of the Fourth Embodiment]

The fourth embodiment is capable of forcibly interrupting the current flow between the power supply terminal (74) and the load terminal (75) by the cutting apparatus (10). Thus, even if, e.g., the movable contact (73) and the fixed contacts (68, 69) are welded together, the current flow between the power supply terminal (74) and the load terminal (75) is forcibly interrupted by the cutting apparatus (10), whereby failures of load equipments can be prevented.

Fifth Embodiment

A fifth embodiment of the present invention will be described below.

Figure 19:
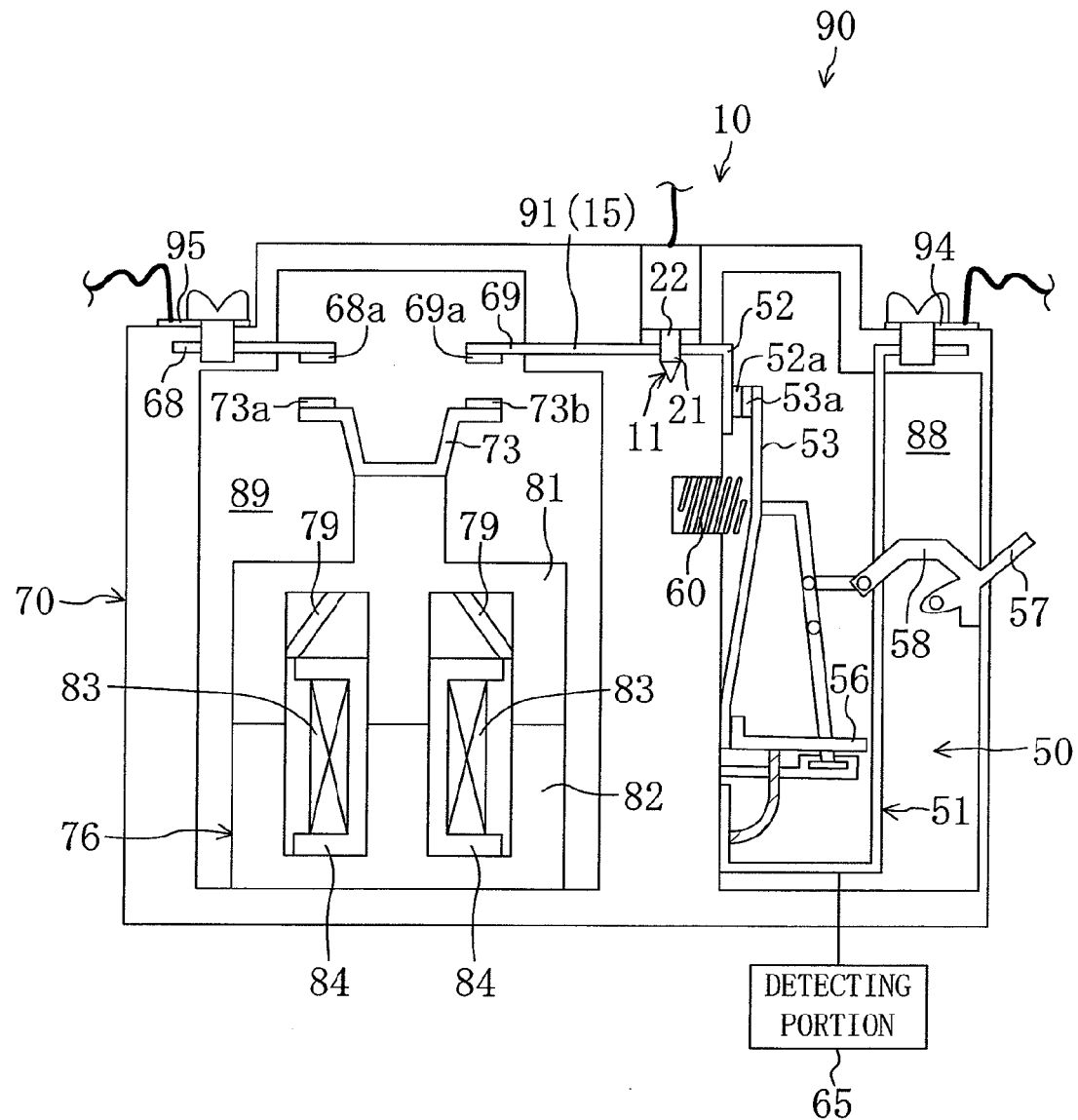
FIG. 19 is a schematic structural diagram of an electrical circuit breaker according to a fifth embodiment.

The fifth embodiment is an electrical circuit breaker (90) having a cutting apparatus (10) according to the present invention. As shown in FIG. 19, the electrical circuit breaker (90) includes a breaker (50), a contactor (70), and a resin casing (91). Note that description of the breaker (50) and the contactor (70) is omitted.

In the casing (91), a breaker placing chamber (88) where the breaker (50) is placed, and a contactor placing chamber (89) where the contactor (70) is placed are formed with a partition wall therebetween. The casing (91) is provided with a load terminal (95), a power supply terminal (94), and a connecting member (92) configured to connect the breaker (50) and the contactor (70). The connecting member (92) is formed by the current-carrying member (15).

The load terminal (95) is connected to the first fixed contact (68) of the contactor (70). The power supply terminal (94) is connected to the movable contact (53) of the breaker (50). One end of the connecting member (92) is connected to the second fixed contact (69) of the contactor (70). The other end of the connecting member (92) is connected to the fixed contact (52) of the breaker (50).

The electrical circuit breaker (90) further includes the cutting apparatus (10) described above, and a welding detecting portion (65) similar to that of the third embodiment. Note that any of the cutting apparatuses (10) of the first embodiment, the second embodiment, and other embodiments described below may be used as the cutting apparatus (10).

The cutting apparatus (10) is positioned so as to be able to cut the connecting member (92). Specifically, the cutting apparatus (10) is provided so that the blade portion of the blade (11) faces the front face of the connecting member (92) before the blade (11) advances. A V-shaped fitting groove is formed at a position on the back side of the cutting location of the connecting member (92).

In the fifth embodiment, when the welding detecting portion (65) determines that the movable contact (53) and the fixed contact (52) are welded together in the breaker (50), and/or determines that the movable contact (73) and the fixed contacts (68, 69) are welded together in the contactor (70), the welding detecting portion (65) operates the ignition portion (18), whereby the blade (11) advances. After cutting (breaking) the connecting member (92), the blade (11) stops while fitting in the fitting groove. In this state, the insulating portion (22) of the blade (11) contacts the cut faces of the connecting member (92). That is, the blade (11) advances until the insulating portion (22) contacts the cut faces of the connecting member (92).

[Advantages of the Fifth Embodiment]

The fifth embodiment is capable of interrupting the current flow between the power supply terminal (94) and the load terminal (95) by cutting the connecting member (92) with the cutting apparatus (10). Thus, even if, e.g., welding occurs in the breaker (50) and/or the contactor (70), the current flow between the power supply terminal (94) and the load terminal (95) is interrupted by the cutting apparatus (10), whereby failures of load equipments can be prevented.

Other Embodiments

The above embodiments may be configured as described below.

Figure 20:
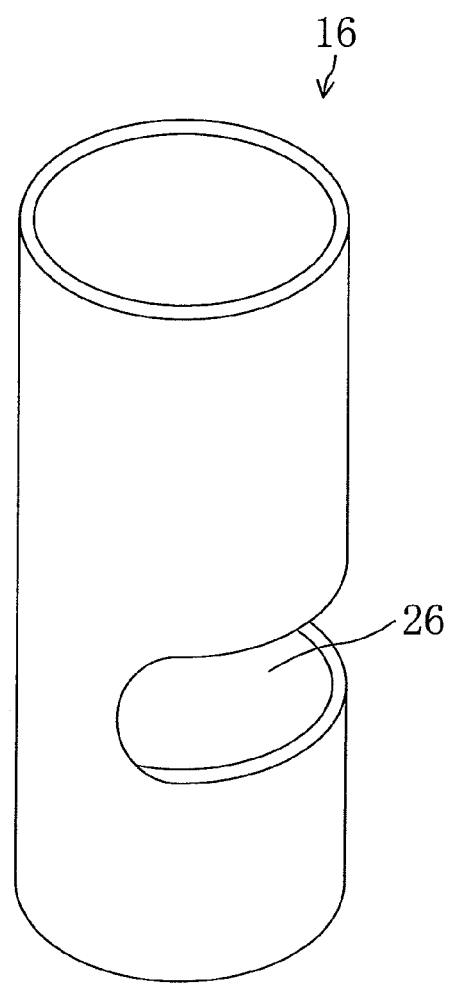
FIG. 20 is a perspective view of a cylindrical member according to other embodiment.

As shown in FIG. 20, in the second embodiment, only one placing hole (26) may be formed in the cylindrical case (16). The placing hole (26) extends in a C shape as viewed in the axial direction of the cylindrical case (16). A current-carrying member (15) is placed by insertion through the placing hole (26).

In the second embodiment, the case main body (41) of the cylindrical case (16) may be made of an insulating material.

In the above embodiments, the cutting apparatus (10) may be configured so that the blade (11) is advanced by means (e.g., a motor) other than a reaction of a gas generating agent.

Note that the above embodiments are essentially preferable examples, and are not intended to limit the scope of the present invention, its applications, and its uses.

INDUSTRIAL APPLICABILITY

As described above, the present invention is useful for cutting apparatuses that are configured to cut a current-carrying member configured to conduct electricity, breakers using the cutting apparatus, contactors using the cutting apparatus, and electrical circuit breakers using the cutting apparatus.

The invention claimed is:

1. A cutting apparatus, comprising a blade, and configured to advance the blade in a predetermined advance direction to cut a current-carrying member configured to conduct electricity, wherein
    the blade includes a cutting portion, which is made of a metal and has a blade portion configured to cut the current-carrying member, and an insulating portion, which is formed by an insulating member and forms a part that adjoins the blade portion in a direction opposite to the advance direction, and
    the cutting apparatus is configured so that, when cutting the current-carrying member, the blade advances to an insulating position at which the insulating portion contacts cut faces of the current-carrying member beyond a cutting position at which the cutting portion cuts the current-carrying member.

2. The cutting apparatus of claim 1, wherein
    the insulating portion of the blade is provided so as to adjoin the cutting portion in a direction opposite to the advance direction.

3. The cutting apparatus of claim 1, further comprising:
a cylindrical case configured to accommodate the blade, wherein
the cylindrical case has a placing hole configured to insert therethrough the current-carrying member to be cut, and
the placing hole is formed so as to be located on an advance side of the blade portion of the blade before the blade advances.

4. The cutting apparatus of claim 3, wherein
the cylindrical case includes a cylindrical case main body, which is made of a metal and has the placing hole formed therein, and an insulating case insulating portion, which covers a region surrounding the placing hole in an inner surface of the case main body.

5. The cutting apparatus of claim 4, wherein
the case insulating portion is formed by a pair of fixing members, which are provided along the inner surface of the case main body, and are configured to hold the current-carrying member therebetween.

6. The cutting apparatus of claim 5, wherein
the cutting portion has a columnar shape,
the pair of fixing members have a cylindrical shape so that the blade can be inserted therethrough,
the cutting portion has an insertion portion configured to insert the current-carrying member therethrough, the insertion portion being formed by a through hole or a cut-out, which extends between side surfaces of the cutting portion,
a part of the cutting portion, which adjoins the insertion portion on a side opposite to a side to which the blade advances, serves as the blade portion, and
the blade is provided so that an outer peripheral surface of the cutting portion faces respective inner peripheral surfaces of both fixing members before the blade advances.

7. The cutting apparatus according to claim 3, further comprising:
an insulating member provided between a peripheral side surface of the placing hole and the current-carrying member.

8. The cutting apparatus of claim 3, wherein
a region surrounding the placing hole in an inner surface of the case main body, or a peripheral side surface of the placing hole is coated with an insulating material.

9. The cutting apparatus of claim 3, wherein
the cutting apparatus is configured so as to advance the blade by increasing a pressure in a gas generating chamber by a high pressure gas generated by a reaction of a gas generating agent, the gas generating chamber being formed on a side opposite to a side to which the blade advances in the cylindrical case,
the insulating portion has a columnar shape, and
after the blade advances, an entire periphery of the insulating portion contacts a region located on a gas generating chamber side of the current-carrying member in the inner surface of the cylindrical case.

10. The cutting apparatus of claim 9, wherein
the insulating portion includes a columnar insulating portion main body, and a sealing protruding portion provided along an entire circumference of the insulating portion main body so as to protrude outward beyond an outer peripheral surface of the insulating portion main body, and
after the blade advances, the sealing protruding portion of the insulating portion contacts the region located on the gas generating chamber side of the current-carrying member in the inner surface of the cylindrical case.

11. The cutting apparatus of claim 3, wherein
the insulating portion includes a columnar insulating portion main body, and a latching protruding portion protruding outward beyond an outer peripheral surface of the insulating portion main body, and
the latching protruding portion fits in the placing hole after the blade advances.

12. The cutting apparatus of claim 3, wherein
the insulating portion includes a columnar insulating portion main body, and a protruding portion protruding outward beyond an outer peripheral surface of the insulating portion main body, and
the cylindrical case has a blade holding portion formed so that the protruding portion of the insulating portion fits in the blade holding portion before the blade advances.

13. The cutting apparatus of claim 1, further comprising:
a blade stop portion positioned on a side to which the blade advances, so that the cutting portion fits in the blade stop portion after cutting the current-carrying member.

14. The cutting apparatus of claim 13, wherein
the blade stop portion has a fitting groove formed so that a cutting edge of the blade portion of the cutting portion fits in the fitting groove after cutting the current-carrying member.

15. The cutting apparatus of claim 14, wherein
the blade stop portion is made of a material that is softer than the cutting portion, and
the fitting groove has a V-shaped cross section, and an angle between wall surfaces of the fitting groove is narrower than an angle of the cutting edge of the cutting portion.

16. The cutting apparatus of claim 14, wherein
the cutting portion has a columnar shape,
the cutting edge of the blade portion of the cutting portion is formed along an outer circumference of a top end of the cutting portion, and
in the blade stop portion, the fitting groove extends in a circular shape corresponding to a shape of the cutting edge of the blade portion of the cutting portion.

17. The cutting apparatus of claim 1, wherein
the insulating portion forms at least one of both side portions of the blade, which extend continuously with a base end of a cutting edge portion of the blade.

18. A breaker, comprising:
an inter-terminal member having a movable contact and a fixed contact, formed by a current-carrying member, and configured to connect a power supply terminal and a load terminal,
the breaker being configured so that, in case of an abnormal current, the movable contact automatically separates from the fixed contact to interrupt a current flow between the power supply terminal and the load terminal, and further comprising:
the cutting apparatus of claim 1, which is positioned so as to be able to cut the inter-terminal member.

19. A contactor, comprising:
an inter-terminal member having a movable contact and a fixed contact, formed by a current-carrying member, and configured to connect a power supply terminal and a load terminal,
the contactor being configured to control a current flow between the power supply terminal and the load terminal by moving the movable contact, and further comprising:
the cutting apparatus of claim 1, which is positioned so as to be able to cut the inter-terminal member.

20. An electrical circuit breaker, comprising:
a breaker connected to a power supply terminal;
a contactor connected to a load terminal;
a connecting member formed by a current-carrying member, and configured to connect the breaker and the contactor; and
the cutting apparatus of claim 1, which is positioned so as to be able to cut the connecting member.

\* \* \* \* \*